US007793696B2

(12) United States Patent
Matsumoto et al.

(10) Patent No.: US 7,793,696 B2

(45) Date of Patent: Sep. 14, 2010

(54) ROLL SHEET HOLDER

(75) Inventors: Haruki Matsumoto, Nagoya (JP); Yasunori Nakamura, Shinshiro (JP); Terumasa Hoshino, Nagoya (JP); Hiroshi Takami, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1146 days.

(21) Appl. No.: 11/441,683

(22) Filed: May 26, 2006

(65) Prior Publication Data

US 2007/0059084 A1 Mar. 15, 2007

(30) Foreign Application Priority Data

Aug. 30, 2005 (JP) ............................ 2005-248940

(51) Int. Cl.

| | |
|---|---|
| ***B29C 65/00*** | (2006.01) |
| ***B32B 37/00*** | (2006.01) |
| ***B32B 41/00*** | (2006.01) |
| ***B32B 38/04*** | (2006.01) |
| ***B32B 38/10*** | (2006.01) |
| ***B65C 9/40*** | (2006.01) |
| ***B65C 11/02*** | (2006.01) |
| ***B65C 9/46*** | (2006.01) |
| ***G05G 15/00*** | (2006.01) |
| ***B26D 5/00*** | (2006.01) |
| ***B65H 26/00*** | (2006.01) |

(52) U.S. Cl. ....................... 156/362; 156/353; 156/354; 156/355; 156/361; 156/363; 156/364; 156/384; 156/387; 156/510; 156/538

(58) Field of Classification Search ......... 156/353–364, 156/384–388, 510, 538

See application file for complete search history.

(56) References Cited

U.S. PATENT DOCUMENTS

| | | | | |
|---|---|---|---|---|
| 3,039,516 | A * | 6/1962 | Vinal | 156/361 |
| 3,655,492 | A * | 4/1972 | Burton | 156/541 |
| 5,699,166 | A | 12/1997 | Edatsune et al. | |
| 5,943,804 | A | 8/1999 | Linquist et al. | |
| 5,980,142 | A * | 11/1999 | Inui | 400/708 |
| 6,668,892 | B2 * | 12/2003 | Vasilakes et al. | 156/387 |
| 2001/0016995 | A1 | 8/2001 | Bradley | |
| 2003/0221784 | A1 * | 12/2003 | Dods | 156/361 |
| 2005/0230051 | A1 * | 10/2005 | Yamamoto et al. | 156/361 |

* cited by examiner

FOREIGN PATENT DOCUMENTS

JP 560 35654 U 4/1981

*Primary Examiner*—Khanh Nguyen
*Assistant Examiner*—Matthew Hoover
(74) *Attorney, Agent, or Firm*—Day Pitney LLP

(57) ABSTRACT

The disclosure provides a roll sheet holder for producing labels which can be easily put on a slim stick-type member used in foods without being wound on and adhered to the stick-type member, and be completely removed from the stick-type member. The roll sheet is made of a continuous thermal sheet having self-coloring property having no adhesive layer on its back side, and the like, and wound on a roll sheet holder with a back face facing outward. A plurality of encoder marks are provided on an edge of the back face of the roll sheet in a width direction, with predetermined pitch size in a feeding direction. The predetermined pitch size of the encoder marks is arranged to be equal to a length between cutting lines along which the printed roll sheet is cut. Behind the encoder marks in the feeding direction, a dog-leg shaped slits, projecting backward in the feeding direction are made in each substantially center between the cutting lines.

18 Claims, 20 Drawing Sheets

ROLL SHEET HOLDER

TECHNICAL FIELD

The disclosure relates to a roll sheet holder holding a long roll sheet, and arranged to be removably mounted and used in the tape printer which comprises a feeding device for feeding the long roll sheet, a printing device for printing on the roll sheet, and a cutting device for cutting the printed roll sheet.

BACKGROUND

Conventionally, there have been suggested various labels which are wound on and adhered to an AC cord and a distribution cord.

Japanese utility model publication laid-open No. S56 (1981)-35654 (page 1, line 13 to page 4, line 6 and FIGS. 2A to 4) discloses a label composed of a first adhesive part which is wound on and adhered to an object to be adhered, second and third adhesive parts which adhere to each other interposing the first adhesive part, and a release paper removably provided on the back side thereof. The release paper has slits on both sides of the first adhesive part so that the first adhesive part is removed separately.

In the above structure, the slits are provided on the release paper so that a part of the release paper facing to the adhesive part which is wound on and adhered to the object to be adhered can be independently removed. Therefore, the other adhesive parts can be prevented from sticking to each other in an adhering work, and thus the label can be easily and neatly wound on and adhered to the object.

The conventional label mentioned above, however, cannot be removed clearly from the object, with an adhesive left on the object, because of the temperature and the humidity. Furthermore, in the case where the object to be adhered is a slim stick-typed member used for food-related goods, the available adhesive has less adhesive strength and storage life, so that the label is apt to come unstuck.

SUMMARY

The disclosure has been made in view of the above circumstances and has an object to overcome the above problems and to provide a roll sheet holder to that produce labels which can be put on a slim stick-type member used in the food-related goods without being wound on and adhered to the stick-type member, and be completely removed from the stick-type member without any adhesive left.

To achieve the above object, there is provided a roll sheet holder holding a long roll sheet, and arranged to be removably mounted and used in a tape printer, the tape printer comprises: a feeding device that unwinds and feeds the long roll sheet; a printing device that prints on the roll sheet fed with the feeding device; and a cutting device that cuts the printed roll sheet printed with the printing device, wherein the roll sheet having an insertion part into which a stick-type member is insertable, formed with a predetermined pitch in a longitudinal direction of the roll sheet.

The roll sheet holder holds a long roll sheet having the insertion part into which the stick-type member can be inserted, with predetermined pitch size in a longitudinal direction, and is removably mounted in the tape printer. Accordingly, the roll sheet is printed with the print data by the feeding device and the printing device which are driven and controlled, and then the printed roll sheet is cut. This operation can easily and successively provide the printed labels on which the predetermined print data such as the expiration date and time of the item is printed, and the insertion part into which the stick-type member can be inserted is formed.

DETAILED DESCRIPTION

A detailed description of first through eleventh exemplary embodiments of a roll sheet holder will now be given referring to the accompanying drawings.

First Exemplary Embodiment

Firstly, a schematic structure of a tape printer in the first exemplary embodiment will be explained with reference to FIGS. 1 to 4.

Figure 1:
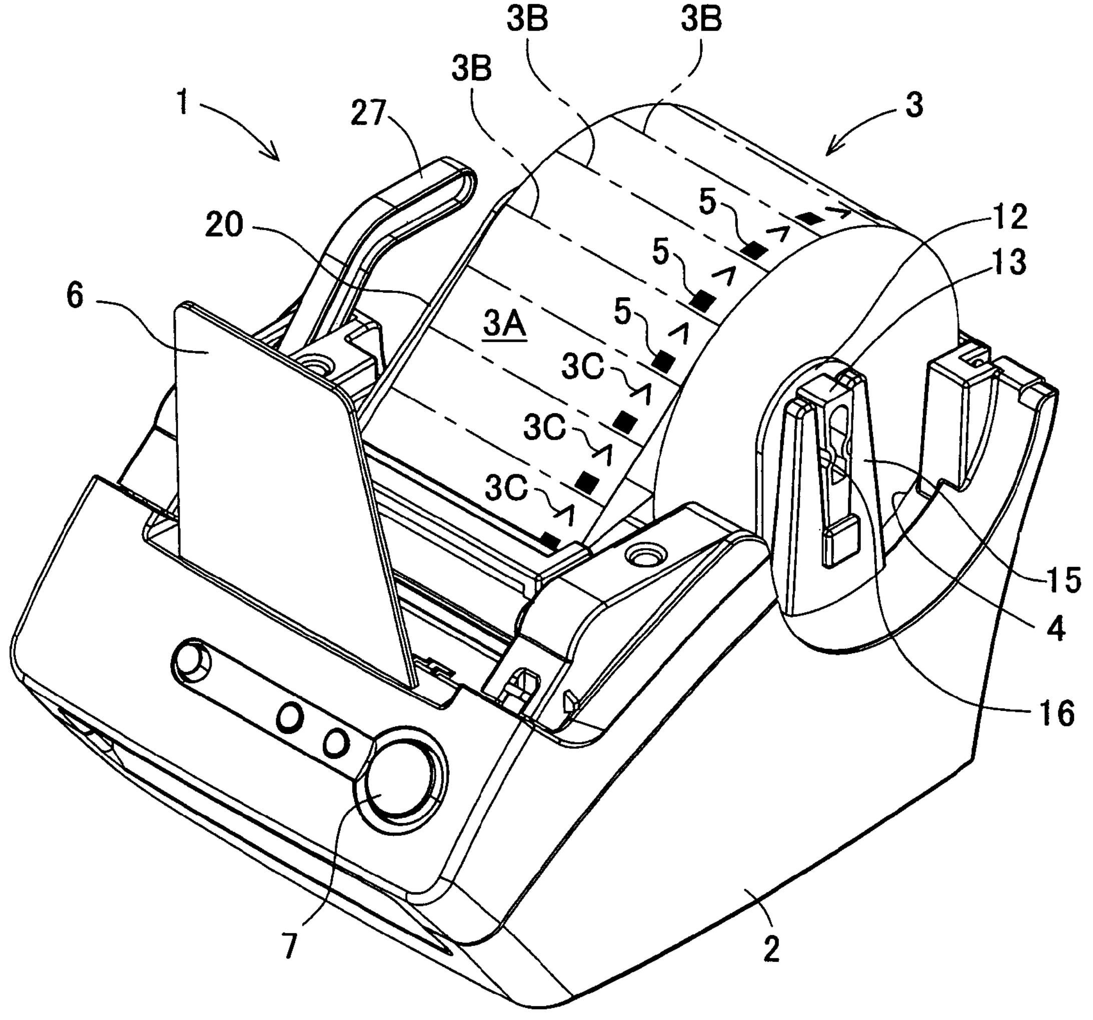
FIG. 1 is a schematic perspective view of a tape printer of a first exemplary embodiment, in which a roll sheet holder holding a roll sheet of a maximum width is set, and from which a top cover is removed.

As shown in FIG. 1, a printer 1 comprises a housing 2 (a main body) and a roll sheet holder storage part 4 (hereinafter, a "holder storage part") which is a space for receiving a roll sheet holder 3 holding an unfixed-length roll sheet 3A of a predetermined width (hereinafter, a "roll sheet"). A top cover (not shown) made of transparent resin attached to the housing 2 at a rear upper edge, is freely opened and closed, thereby covering an upper part of the holder storage part 4. The printer 1 further comprises a tray 6 made of transparent resin disposed in a standing position to face to a substantially front center of the top cover, a power button 7 placed in front of the tray 6, and others. A power cord 10 (see FIG. 3) is connected to the housing 2 on a back face near a corner. The housing 2 is provided on the back face near the other corner with a connector part (not shown) such as a USB (Universal Serial Bus) which is connected to for example a personal computer not shown.

The roll sheet 3A is made of a continuous thermal sheet (so-called thermal paper) having self-coloring property without an adhesive layer on its back side, and the like. The roll sheet 3A is wound on a cylindrically shaped core with a printing face facing inward, or equivalently, with a back face outward. On opposite side of a photo sensor 11 (see FIG. 3) as a mark detection sensor described later, a plurality of encoder marks 5 are provided on an edge of the back face of the roll sheet 3A in a width direction, with predetermined pitch size (such as 10 mm, 20 mm and 30 mm) in a feeding direction. The predetermined pitch size of the encoder marks 5 is arranged to be equal to a length between cutting lines 3B along which the printed roll sheet 3A is cut. Behind the encoder marks 5 in the feeding direction, a dog-leg shaped slits 3C, projecting backward in the feeding direction are made in each substantially center between the cutting lines 3B. A triangle, formed by two sides of the slit 3C and a line connecting both end points of the slit 3C on the front side in the feeding direction, is formed large enough to allow a stick-type member (such as a stick of a frankfurter) to be inserted into the slit 3C (see FIG. 7).

Figure 2A:
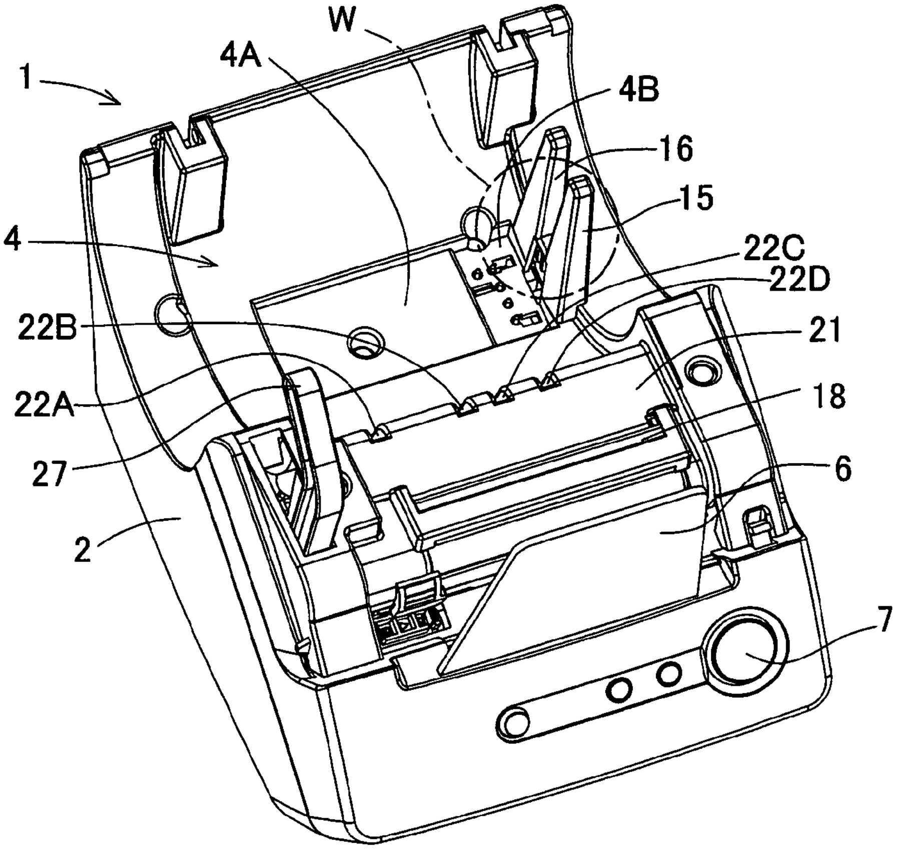
FIG. 2A is a schematic perspective view of the tape printer of the first exemplary embodiment, in which the roll sheet holder is mounted, and from which the top cover is removed.
Figure 2B:
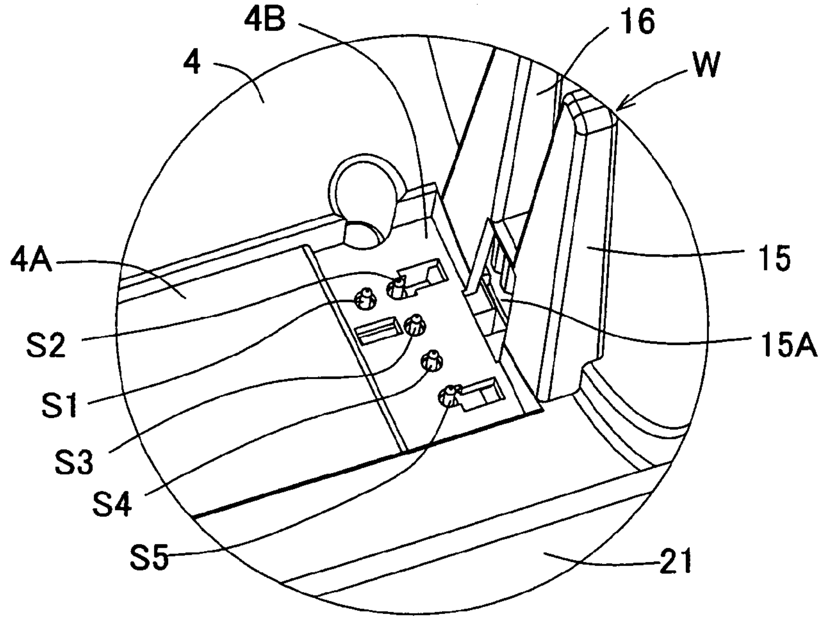
FIG. 2B is an enlarged view of a part W in FIG. 2A enclosed with a chain line.

As shown in FIGS. 1 to 2B, the tape printer 1 is provided with a holder support member 15 in the holder storage part 4 at a side end (a right side end in FIG. 2A) in a substantially perpendicular direction to the feeding direction. The holder support member 15 receives a mounting piece 13 of a positioning holding member (hereinafter, a "holding member") 12 constructing the roll sheet holder 3 mentioned later. The mounting piece 13 is provided protruding in a substantially rectangular shape in section on an outer surface of the holding member 12. Specifically, the holder support member 15 provides a first positioning groove 16 shaped like a substantially upright U-shape as seen in side view of the tape printer 1 and opening upward. The holder support member 15 is also formed with a recess 15A at an inner base end thereof. The recess 15A engages with an elastic locking piece 12A (see FIG. 5B) formed projecting at a lower end of the holding member 12.

Figure 3:
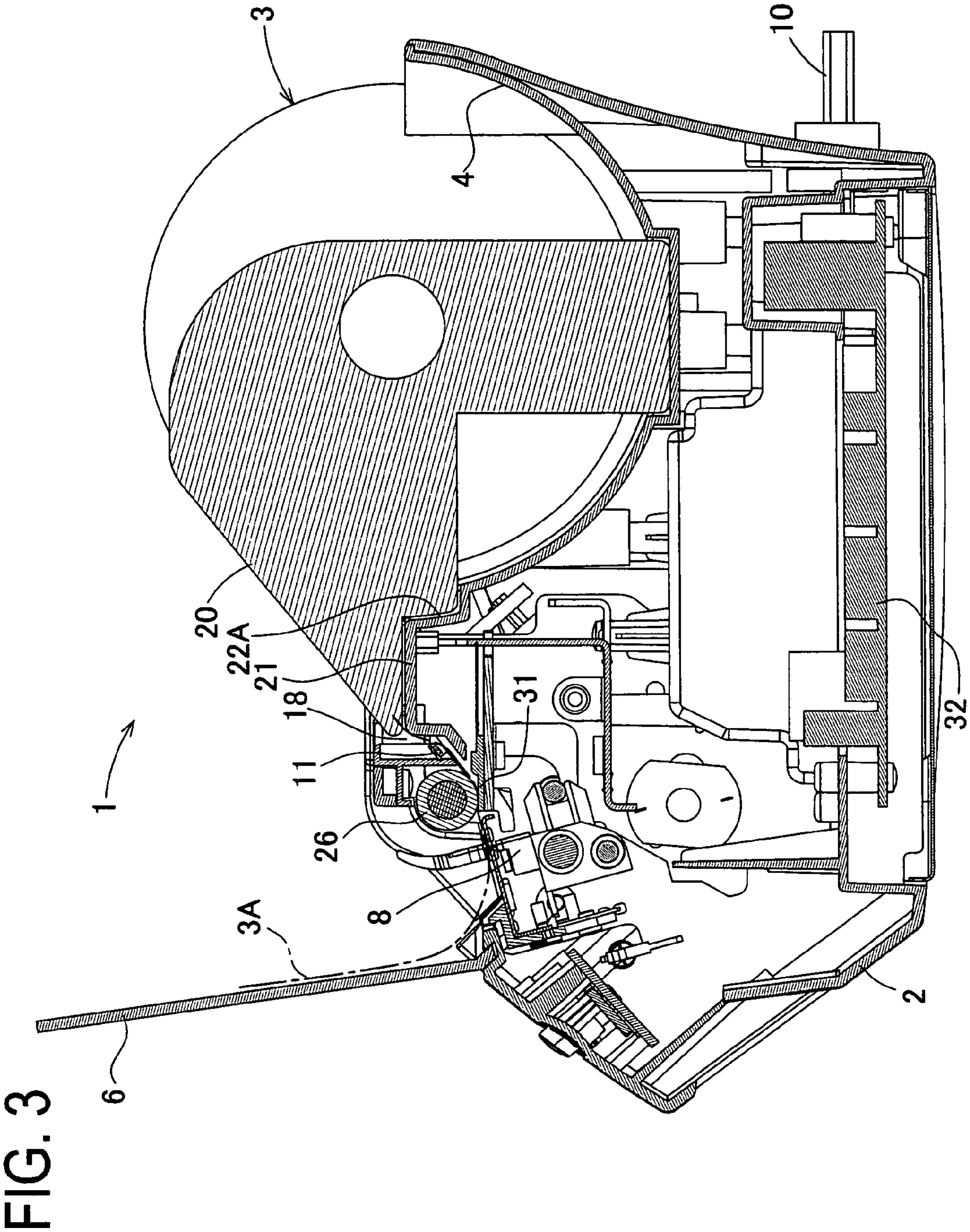
FIG. 3 is a sectional view of the tape printer of the first exemplary embodiment, in which the roll sheet holder holding the roll sheet of a maximum width is set, and from which the top cover is removed.

The housing 2 is formed with an insertion port 18 into which the roll sheet 3A is insertable. A flat portion 21 is formed to be substantially horizontal between a rear end of the port 18 and a front upper edge portion of the holder storage part 4. On this flat portion 21, a front end of a guide member 20 of the roll sheet holder 3 is placed. The flat portion 21 is provided at a rear corner in the feeding direction with four second positioning grooves 22A to 22D each formed by a substantially L-shaped wall in section and positioned corresponding to each of a plurality of roll sheet 3A of different widths. Each of the second positioning grooves 22A to 22D is configured to fittingly receive a part in contact with the flat portion 21 in the guide member 20, inserted from above, as shown in FIG. 3. Further, the front end of the guide member 20 of the roll sheet holder 3 extends to the insertion port 18.

A positioning recess 4A is formed in the bottom of the holder storage part 4. The positioning recess 4A is rectangular in plan view and long sideways in a direction substantially perpendicular to the feeding direction, extending from the inner base end of the holder support member 15 to a position corresponding to the second positioning groove 22A. This positioning recess 4A has a predetermined depth (about 1.5 mm to 3.0 mm in the first exemplary embodiment). The width of the positioning recess 4A in the feeding direction is determined to be almost equal to the width of each lower end portion of the holding member 12 and the guide member 20. A discrimination recess 4B is provided between the positioning recess 4A and the inner base end of the holder support member 15. This discrimination recess 4B is rectangular in plan view, which is long in the feeding direction, and has a depth larger by a predetermined amount (about 1.5 mm to 3.0 mm in the first exemplary embodiment) than the positioning recess 4A. The discrimination recess 4B will receive a roll sheet discrimination part 60 (see FIG. 5B) mentioned later which extends inward from the lower end of the holding member 12 at a right angle therewith.

In the discrimination recess 4B, there are provided five sheet discrimination sensors S1, S2, S3, S4, and S5 arranged in an L-shaped pattern for distinguishing the kind of the roll sheet 3A, the material of the thermal sheet, the width of the roll sheet 3A, the presence or absence of the encoder mark 5 and a through hole 131 (see FIG. 17) described later, the pitch size of the encoder mark 5 in the feeding direction and the through hole 131 mentioned later, the presence or absence of the slit 3C, and the like. These sensors S1 to S5 are each constructed of a well known mechanical switch including a plunger and a push-type microswitch. A top end of each plunger protrudes through the bottom of the discrimination recess 4B to approximately the bottom of the positioning recess 4A. It is detected whether the roll sheet discrimination part 60 has sensor holes 60A to 60E (see FIG. 5B), mentioned later, at the positions corresponding to the sheet discrimination sensors S1 to S5 respectively. Based on an ON/OFF signal of each sensor S1 to S5, the kind of the roll sheet 3A set in the roll sheet holder 3, the material of the thermal sheet, the width of the roll sheet 3A, the presence or absence of the encoder mark 5 and the through hole 131, the pitch size of the encoder mark 5, the through hole 131 in the feeding direction, and the presence or absence of the slit 3C, and the like, are detected.

In each of the sheet discrimination sensor S1 to S5 of the first exemplary embodiment, the plunger usually protrudes through the bottom of the discrimination recess 4B to approximately the bottom of the positioning recess 4A. At this time, each microswitch is in an OFF state.

In the case where the roll sheet discrimination part 60 has some sensor hole(s) 60A at the positions corresponding to the sheet discrimination sensors S1 to S5, the plunger(s) of the sensor(s) for which the roll sheet discrimination part 60 has sensor hole(s) 60A is allowed to pass through the associated sensor holes 60A without depression, leaving the corresponding microswitch(es) in the OFF state, which generates an OFF signal. On the other hand, the plunger(s) of the sensor(s) for which the printing medium discrimination part 60 has no sensor hole(s) is depressed, bringing the corresponding microswitch(es) into the ON state, which generates an ON signal. Accordingly, the sheet discrimination sensors S1 to S5 output five-bit signals including a signal "0" and signal "1". For instance, when all of the sheet discrimination sensors are the OFF state, that is, nothing is set in the roll sheet holder 3, five-bit signals "00000" are output.

The insertion port 18 is arranged so that its one side end (a right end in FIG. 2A) on the holder support member 15 side is substantially flush with the inner surface of the holding member 12 when engaged in the holder support member 15. A guide rib is formed at the side end of the insertion port 18 on the holder support member 15 side.

A lever 27 for operating a vertical movement of a thermal head 31 (see FIG. 3) is provided in front of the other side end (a left side end in FIG. 2A) of the holder storage part 4 in the feeding direction. When the lever 27 is turned up, the thermal head 31 is turned down, separating a platen roller 26 (see FIG. 3). On the other hand, when the lever 27 is turned down, the thermal head 31 is turned up, causing the platen roller 26 to press the part of the roll sheet 3A. Thus, the printer is placed in a printing enabled state. Further, a control board 32 (see FIG. 3) formed with a control circuit 61 (see FIG. 6) is provided below the holder storage part 4. This control circuit 61 drives and controls each mechanism in response to commands from an external personal computer and others.

As mentioned above, the mounting piece 13 of the holding member 12 is fit in the first positioning groove 16 of the holder support member 15. The elastic locking piece 12A formed projecting at the lower end of the holding member 12 is engaged in the recess 15A formed at the inner base end of the holder support member 15. Each of the second positioning grooves 22A to 22D receives a face under the front end of the guide member 20 so that the lower end of the guide member 20 is inserted in the positioning recess 4A to be brought into contact therewith. Thus, the roll sheet holder 3 holding the roll sheet 3A wound on the cylindrical core is mounted in the holder storage part 4 to be freely removable therefrom. Simultaneously, the roll sheet discrimination part 60 extending inward from the lower end of the holding member 12 is fitted in the discrimination recess 4B, thereby it can be detected whether the roll sheet discrimination part 60 has the sensor holes 60A to 60E at the positions corresponding to the sheet discrimination sensors S1 to S5 respectively. Therefore, the kind of the roll sheet 3A set in the roll sheet holder 3 and the like can be detected.

While the lever 27 is in an up position, one side edge of the roll sheet 3A is guided in contact with the inner surface of the guide member 20 and the other side edge is guided in contact with the protruding guide rib provided at the side end of the insertion port 18. Thereafter, the lever 27 is turned down, and the printer is placed in the printing enabled state.

Figure 4:
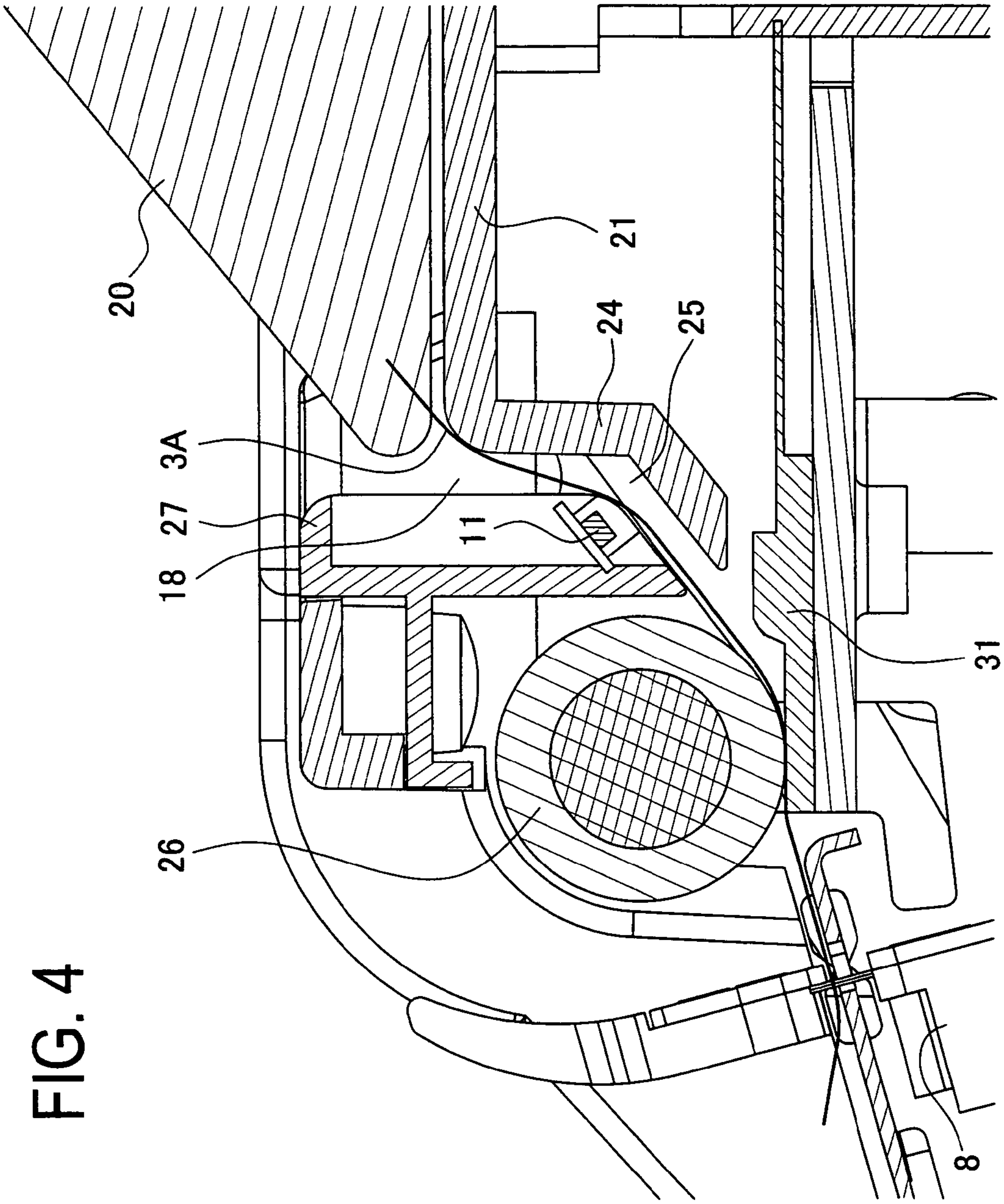
FIG. 4 is an enlarged sectional partial view of positions of a platen roller and a mark detection sensor provided upstream from the platen roller in FIG. 3.

As shown in FIGS. 3 and 4, the lever 27 is turned down, causing the line thermal head 31 to press the roll sheet 3A inserted through the insertion port 18 against the platen roller 26. The thermal head 31 is driven and controlled while the platen roller 26 is rotated by a sheet feeding motor 72 (see FIG. 6) constructed of a step motor or the like, so that image data can be printed in sequence on a printing surface of the roll sheet 3A being fed. When the cutting line 3B which is rear of the printed part in the feeding direction is conveyed to a position opposite to the cutter unit 8, a cutting motor 74 (see FIG. 6) constructed of a step motor or the like drives a cutter unit 8 across the roll sheet 3A reciprocatively, so that the printed part of the roll sheet 3A is cut along the cutting line 3B, and then discharged onto the tray 6.

As shown in FIG. 4, an extended portion 24 is formed extending downward in a predetermined length from a front end of the flat portion 21 on which the end of the guide member 20 is placed. The extended portion 24 has a bent end of a predetermined length to the platen roller 26 side, providing a mirror-reversed L-shape in side view. Upstream from the platen roller 26, a guide member 27 is provided leaving a predetermined clearance for the upper surface of the bent end of the extended portion 24. This clearance forms the insertion opening 18. Further, the upper surface of the bent end of the extended portion 24 and the lower end surface of the guide member 27 form a sheet guide path 25 for guiding the roll sheet 3A to underneath the platen roller 26. Accordingly, the roll sheet 3A having entered the insertion opening 18 is guided along the sheet guide path 25 to underneath the platen roller 26.

In the lower end surface of the guide member 27, with which back surface of the roll sheet 3A is in contact while the sheet 3A is unreeled, the photo sensor 11 which is a reflective photo-sensor serving as the mark detection sensor and a through hole detection sensor is disposed near a corner on the holder support member 15 side. A surface part of the extended portion 24 opposite to the photo sensor 11 is colored or painted black. This photo-sensor 11 detects the presence or the absence of the encoder mark 5 formed on the back surface of the roll sheet 3A and the through hole 131 (see FIG. 17) mentioned later.

It is to be noted that the photo-sensor 11 has to be disposed to face the through hole 131 provided at the one side end on the holder support member 15 side of the roll sheet 3A having a minimum width, when the through hole 131 mentioned later needs to be detected. With this configuration, the tape printer 1 is adaptable to any kinds of the roll sheet 3A of different widths having the encoder mark 5 and the through hole 131, and any kinds of an unfixed-length roll sheet 130 described later (see FIG. 17) of different widths.

However, the photo sensor 11 can be disposed to face the encoder mark 5 provided on the back side of the roll sheet 3A having a minimum width, when the through hole 131 mentioned later is unnecessary to be detected. With this configuration, the tape printer 1 is adaptable to any kinds of the roll sheet 3A of different widths. Further, the encoder mark 5 can be formed inward from the slit 3C in the width direction. This can avoid an overlap of the encoder mark 5 and the slit 3C in the roll sheet 3A having a shorter length between the cutting lines 3B. Accordingly, the encoder mark 5 can be detected with higher accuracy.

Next, the schematic structure of the roll sheet holder 3 will be explained with reference to FIGS. 5A and 5B. In the same roll sheet holder 3, various kinds of the roll sheet 3A of different widths are mounted to be circumferentially rotatable, having a same configuration. Therefore, in the following description, the case where the roll sheet 3A having a maximum width is mounted in the roll sheet holder 3 is explained.

Figure 5A:
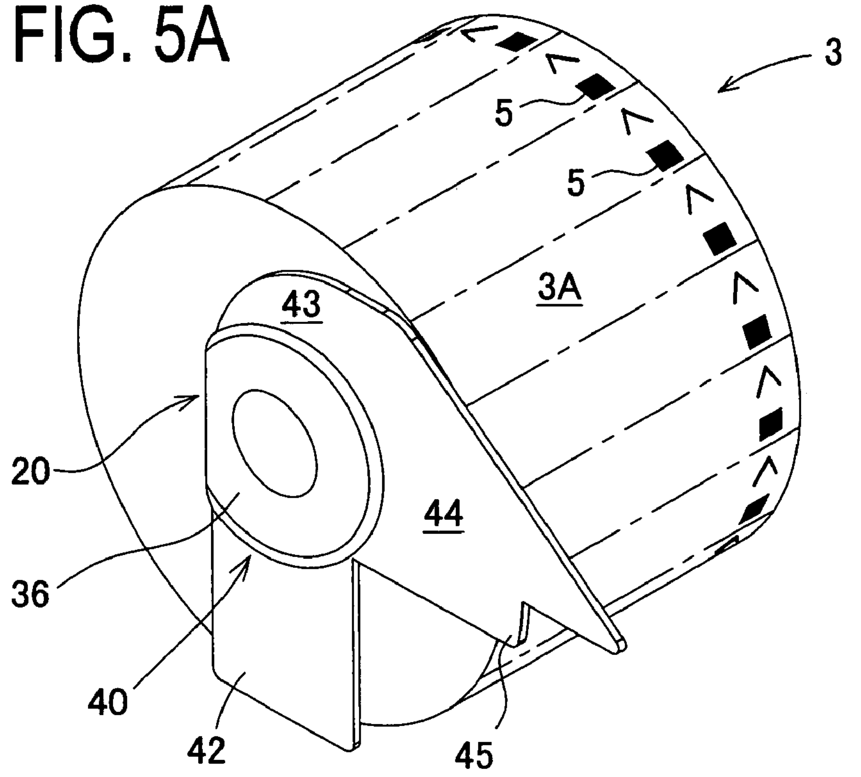
FIG. 5A is a perspective view of the roll sheet holder holding the roll sheet of the first exemplary embodiment, from an upper front side.
Figure 5B:
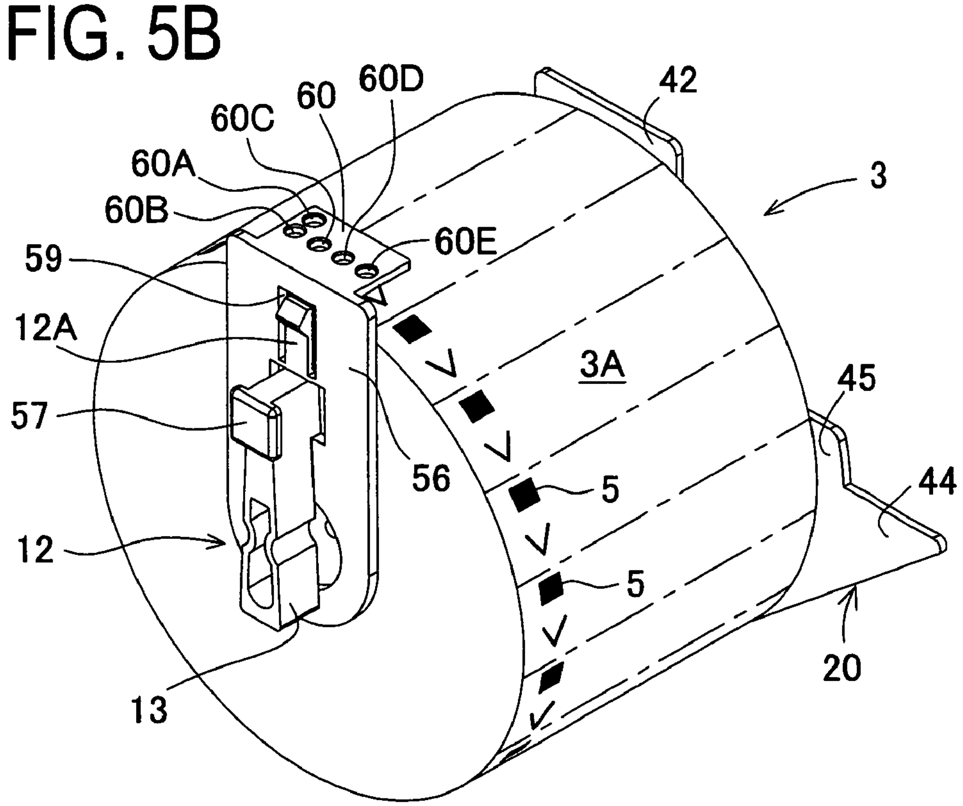
FIG. 5B is a perspective view of the roll sheet holder holding the roll sheet of the first exemplary embodiment, from a lower front side.

As shown in FIGS. 5A and 5B, the roll sheet holder 3 is constructed of the guide member 20, the holding member 12, and a holder shaft 40 of a substantially tube shape. The guide member 20 has a first cylindrical part (not shown) which is fitted at one open end of the sheet core of the roll sheet 3A so that the guide member 20 is held in contact with one of the end faces of the roll sheet 3A. The holding member 12 has a second cylindrical part (not shown) which is fitted in the other open end of the sheet core so that the holding member 12 is held in contact with the other end face of the roll sheet 3A. The holder shaft 40 has two open ends; the one end is fitted in the first cylindrical part of the guide member 20 and formed with a radially extended flange part 36 fixed onto the outer surface of the guide member 20 and the other end is fixedly fitted in the second cylindrical part of the holding member 12. The holder shaft 40 may be selected from among a plurality of shafts of different lengths to easily provide many kinds of roll sheet holders 3 holding the roll sheets 3A of different widths.

The guide member 20 further includes a first, second, third, and fourth extended portions 42, 43, 44, and 45. The first extended portion 42 is formed extending downward in a predetermined length from a lower periphery of an outer end face of the first cylindrical part. This first extended portion 42 is fitted in the positioning recess 4A formed in the bottom of the holder storage part 4 so that the lower end surface of the first extended portion 42 is brought into contact with the bottom surface of the positioning recess 4A. The second extended portion 43 is formed extending upward to cover a front quarter round of the end face of the roll sheet 3A. The third extended portion 44 is formed continuously extending from the second extended portion 43 up to near the insertion opening 18 (see FIG. 3) and has an upper edge sloped downward to the front end. This third extended portion 44 further has a lower edge extending horizontally, which is held in contact with the flat portion 21 of the tape printer 1 so that one side edge of the unwound part of the roll sheet 3A is guided along the inner surfaces of the second and third extended portions 43 and 44 up to the insertion opening 18.

The fourth extended portion 45 is formed under the third extended portion 44 between the rear end of the lower edge at a predetermined distance from the front end and the first extended portion 42. When the lower edge of the third extended portion 44 is held in contact with the placing portion 21, a front edge of the fourth extended portion 45 is inserted in appropriate one of the second placing grooves 22A to 22D corresponding to the sheet width of the roll sheet 3A set in the sheet holder 3 (see FIGS. 3 and 4).

The first and second cylindrical parts serve to rotatably support the sheet core on which the roll sheet 3A is wound. The holder shaft 40 may be selected from among a plurality of shafts of different lengths individually corresponding to the lengths of the sheet cores (i.e., the widths of the roll sheets 3A).

The longitudinal mounting piece 13 is provided protruding outward, at substantially the center of the width of the positioning member 12 in the feeding direction (a lateral direction in FIG. 5B), and extending from an end of the holder shaft 40 in a direction vertical to the axis of the holder shaft 40. This mounting piece 13 is of a substantially rectangular section and a width which becomes smaller in a downward direction so that the mounting piece 13 is fitted in the first positioning groove 16 having a narrower width towards the bottom of the holder support member 15 in the tape printer 1. The protruding distance of the mounting piece 13 is determined to be almost equal to the width (in a direction of the width of the tape printer 1, perpendicular to the feeding direction) of the first positioning groove 16.

The mounting piece 13 of the positioning member 12 is provided, on the lower outer surface, with a guide portion 57 of a square flat plate (about 1.5 mm to 3.0 mm in thickness in the present exemplary embodiment) having a larger width than the lower portion of the mounting piece 13 by a predetermined amount (about 1.5 mm to 3.0 mm in the present exemplary embodiment) on each side of the lower portion. Accordingly, to mount the roll sheet holder 3 in the tape printer 1, the user inserts the mounting piece 13 from above into the first positioning groove 16 by bringing an inner surface of the guide portion 57 into sliding contact with the outer surface of the holder support member 15. Thus, the roll sheet holder 3 can easily be fitted in place.

The positioning member 12 is designed to have the extended portion 56 extending downward longer by a predetermined length (about 1.0 mm to 2.5 mm in the present exemplary embodiment) than the lower end (the first extended portion 42) of the guide member 20. The positioning member 12 is also provided, at the lower end of the extended portion 56, with the sheet discrimination part 60 of a substantially rectangular shape extending inward by a predetermined length at almost right angle to the extended portion 56.

As shown in FIG. 5B, as mentioned above, the sheet discrimination part 60 is formed with the sensor holes 60A to 60E arranged at predetermined positions corresponding to the sheet discrimination sensors S1 to S5 respectively, in the L-shaped pattern in the present exemplary embodiment. In the present exemplary embodiment, the number of the sensor holes is five at the maximum. Specifically, the presence and absence of each hole are allocated "1" and "0" respectively so that the kind of roll sheet 3A held in the roll sheet holder 3, the material of the thermal sheet, the width of the roll sheet 3A, the presence or absence of the encoder mark 5 and the through hole 131 (see FIG. 17) described later, the pitch size of the encoder mark 5 and the through hole 131 in the feeding direction, the presence or absence of the slit 3C, and the like are represented as five bits.

The positioning member 12 is further formed with a longitudinally rectangular through hole 59 in the extended portion 56 under the mounting piece 13. The elastic locking piece 12A is provided extending downward from the upper edge of the through hole 59 and formed with an outward protrusion at a lower end.

The circuit configuration of the tape printer 1 having such structure is explained below by referring to FIG. 6.

Figure 6:
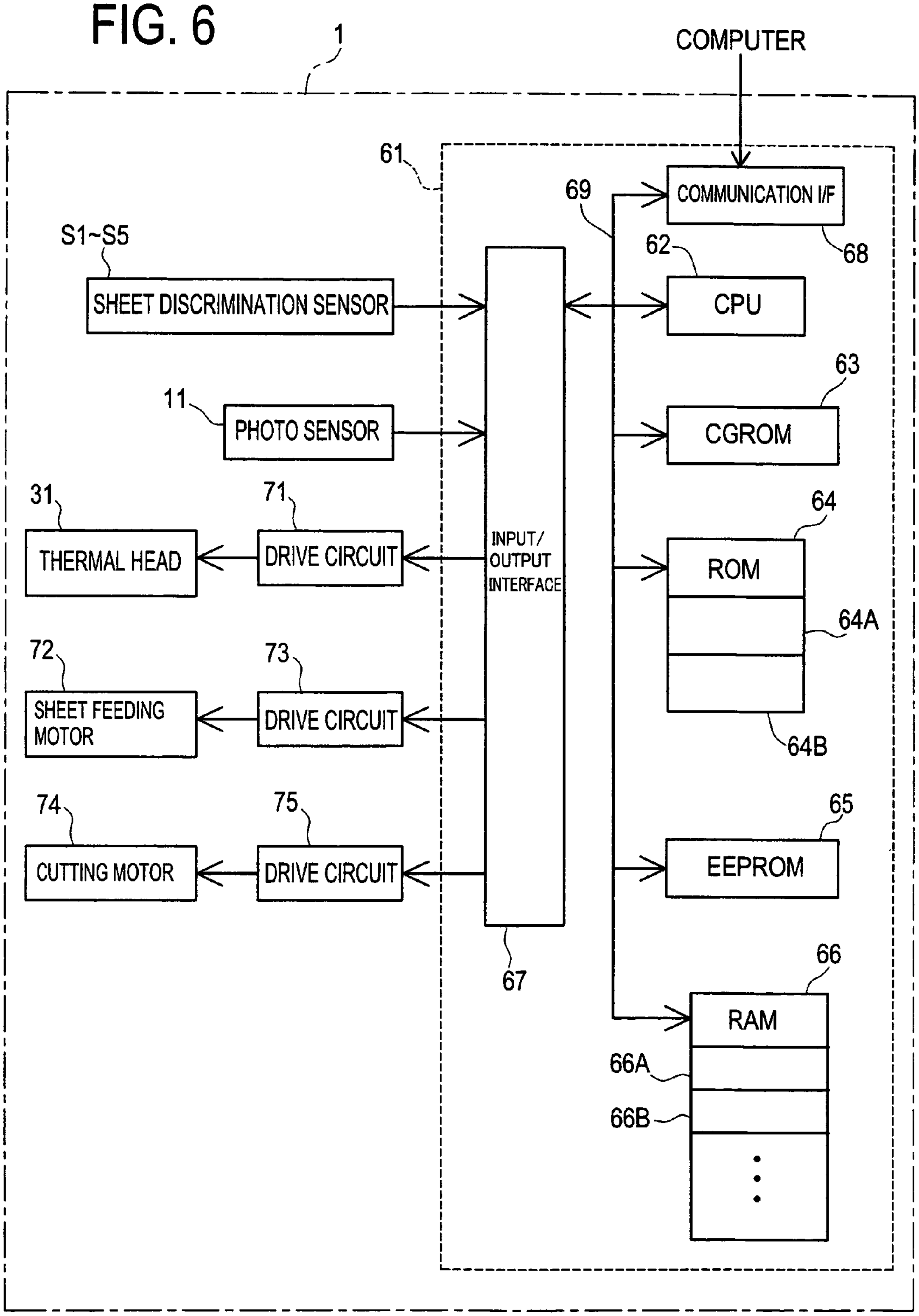
FIG. 6 is a circuit block diagram of main parts of the tape printer in which the roll sheet holder of the first exemplary embodiment is set.

As shown in FIG. 6, the control circuit 61 formed on the control board 32 of the tape printer 1 includes a CPU 62, a CG (character generator) ROM 63, a ROM 64, a flash memory (EEPROM) 65, a RAM 66, an input/output interface (I/F) 67, a communication interface (I/F) 68, and others. Further, the CPU 62, the CGROM 63, the ROM 64, the flash memory 65, the RAM 66, the input/output interface (I/F) 67, and the communication interface (I/F) 68 are mutually connected by means of a bus line 69, so that the data can be exchanged mutually.

In the CG ROM 63, dot pattern data corresponding to each character is stored, and the dot pattern data is read out from the CGROM 63, and the dot pattern is printed on the basis of the dot pattern data on the thermal sheet of the roll sheet 3A.

Further, the ROM 64 stores various programs, that is, various programs necessary for control of the tape printer 1 such as feeding process programs of the roll sheet 3A described below. The ROM 64 also stores the printable regions when the slit 3C and the through hole 131 are formed. The ROM 64 further stores the kind of the roll sheet, the material of the thermal sheet, the width of the roll sheet 3A, the presence or absence of the encoder mark 5 and the through hole 131 (see FIG. 17) described later, the pitch size of the encoder mark 5 and the through hole 131 in the feeding direction, and the presence or absence of the slit 3C, each of which corresponds to each code of 5 bits entered from the sheet discrimination sensors S1 to S5.

For example, in the ROM 64, corresponding to a 5-bit code of "11100" entered from sheet discrimination sensors S1 to S5, kind: "roll sheet 3A", material of thermal sheet: "material A", roll sheet width: "100 mm", pitch size of the encoder mark 5 in the feeding direction: "20 mm", and with or without slit 3C: "with", are stored. Corresponding to a 5-bit code of "11000", kind: "roll sheet 3A", material of thermal sheet: "material B", roll sheet width: "100 mm", pitch size of the encoder mark 5 in the feeding direction: "10 mm", and with or without slit 3C: "with", are stored. Corresponding to a 5-bit code of "10110", kind: "roll sheet 3A", material of thermal sheet: "material A", roll sheet width: "50 mm", pitch size of the encoder mark 5 in the feeding direction: "15 mm", and with or without slit 3C: "with", are stored. Corresponding to a 5-bit code of "10100", kind: "roll sheet 3A", material of thermal sheet: "material B", roll sheet width: "50 mm", pitch size of the encoder mark 5 in the feeding direction: "15 mm", and with or without slit 3C: "without", are stored.

In the case of the thermal sheet of the material A, the maximum feeding speed of the thermal sheet that can be printed by way of the thermal head 31 is 80 mm/sec, and the feeding speed of the roll sheet 3A using thermal sheet of the material A is 80 mm/sec, which is preliminarily stored in the ROM 64. In the case of the thermal sheet of the material B, the maximum feeding speed of the thermal sheet that can be printed by way of the thermal head 31 is 20 mm/sec, and the feeding speed of the roll sheet 3A using the thermal sheet of the material B is 20 mm/sec, which is also preliminarily stored in the ROM 64.

The CPU 62 operates various calculations on the basis of the programs stored in the ROM 64. The ROM 64 stores the outline data specifying the outline of each character classified in type style (Gothic, Roman, etc.) corresponding to the code data, in each character of multiple types of characters. According to the outline data, the dot pattern data is developed on a print buffer 66A.

The flash memory 65 stores the dot pattern data such as optional font data received from outside computer or other device or the dot pattern data such as various pattern data, together with registration numbers, and the contents of storage are supported if the power source of the tape printer 1 is turned off.

The RAM 66 is a temporary storage of various operation results calculated by the CPU 62, and various memories are provided such as print buffer 64A, work region 64B and the like. The print buffer 64A stores dot patterns for printing such a plural characters and symbols, and number of applied pulses as the forming energy quantity of each dot as the dot pattern data, and the thermal head 31 prints dots according to the dot pattern data stored in the print buffer 64A.

The input/output interface 67 connects the sheet discrimination sensors S1 to S5, the photo-sensor 11, and a drive circuit 71 for driving the thermal head 31, and a drive circuit 73 for driving the sheet feeding motor 72 to drive and rotate the platen roller 26, and a drive circuit 75 for driving the cutting motor 74 to move the cutter unit 8 across the roll sheet 3A reciprocatively.

The communication interface 68 is composed of, for example, USB (universal serial bus) or the like, and is connected to an outside computer by means of USB cable or the like, so that two-way data communication is realized.

Next, the feeding process of the roll sheet 3A, which is executed when the roll sheet 3A configured as above with the encoder mark 5 on the back surface thereof is set in the tape printer 1, will be explained with reference to FIGS. 4 and 6.

Firstly, the CPU 62 performs to store the print data imported from the external computers through the communication interface (I/F) 68 in the print buffer 66A.

After that, the CPU 62 judges the presence or absence of input of a print start instruction signal for commanding to print the print data stored in the print buffer 66A by way of the thermal head 31. If the print start instruction signal is input, the CPU 62 reads 5-bit code entered from the sheet discrimination sensors S1 to S5, and stores in the RAM 66.

Continuously, the CPU 62 reads out the 5-bit code from the RAM 66 again. The data including the kind of the roll sheet 3A, the material of the thermal sheet, the width of the roll sheet 3A, the pitch size of the encoder mark 5 in the feeding direction, and the presence or absence of the slit 3C, corresponding to the 5-bit code, is read out from the ROM 64, and then stored in the RAM 66.

If the CPU 62 judges that the roll sheet 3A is set in the roll sheet holder 3, the CPU 62 reads out the data of the "material of the thermal sheet" stored in the RAM 66. Next, the CPU 62 reads out the feeding speed for the "material of the thermal sheet" from the ROM 64, which is decided as the feeding speed for this roll sheet 3A, and stored in the RAM 66.

The CPU 62 reads out the pitch size of the encoder mark 5 in the feeding direction from the RAM 66 again, and then stores the pitch size in the feeding direction as the length between the cutting lines 3B in the RAM 66

The CPU 62 further reads out the data of the "with/without the slit 3C". In the case of "with", the CPU 62 decides that the printing area is to be inward from the slit 3C in the width direction.

Consequently, the CPU 62 starts driving of the sheet feeding motor 72, and rotates the platen roller 26, and starts feeding of the roll sheet 3A at the feeding speed stored in the RAM 66. When the voltage of the output signal entered from the photo sensor 11 becomes the threshold voltage, the CPU 62 determines that the encoder mark 5 is opposite to the photo sensor 11, and the platen roller 26 is rotated by a predetermined number of revolutions until the roll sheet 3A is conveyed to the print start position, and the print data stored in the printing buffer 66A is printed by way of the thermal head 31. After feeding the roll sheet 3A by a predetermined length from the moment of the voltage of the output signal entered from the photo sensor 11 reaching the threshold voltage, if the printing output data is not left over in the printing buffer 66A, the CPU 62 further rotates the platen roller 26 by the predetermined number of revolutions until the cutting line 3B is conveyed to the position opposite to the cutter unit 8, and then stops the sheet feeding motor 72.

The CPU 62 drives the cutting motor 74 to move the cutter unit 8 across the roll sheet 3A reciprocatively, so that the printed part of the roll sheet 3A is cut along the cutting line 3B, and terminates this process. As a result of the process, a printed label having the determined pitch size of the encoder mark 5 has been produced.

For instance, the case where data on an expiration date and time of an item is entered as the print data will be explained with reference to FIG. 7.

Figure 7A:
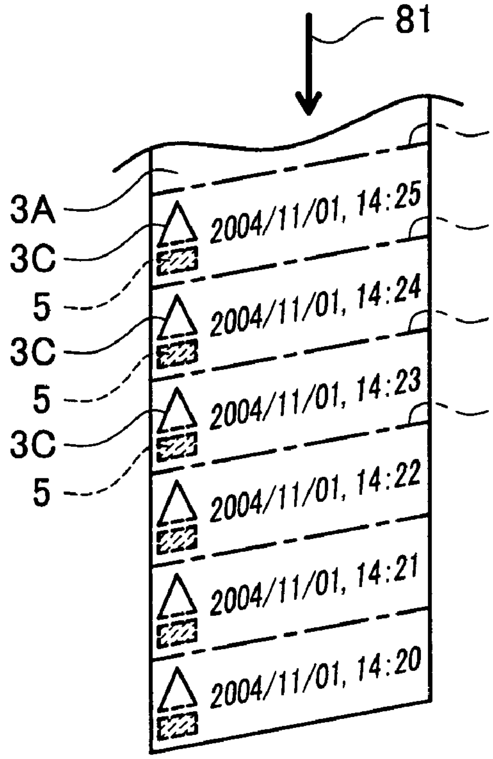
FIG. 7A is a schematic front view of one example of a printed label produced by the roll sheet holder of the first exemplary embodiment.
Figure 7B:
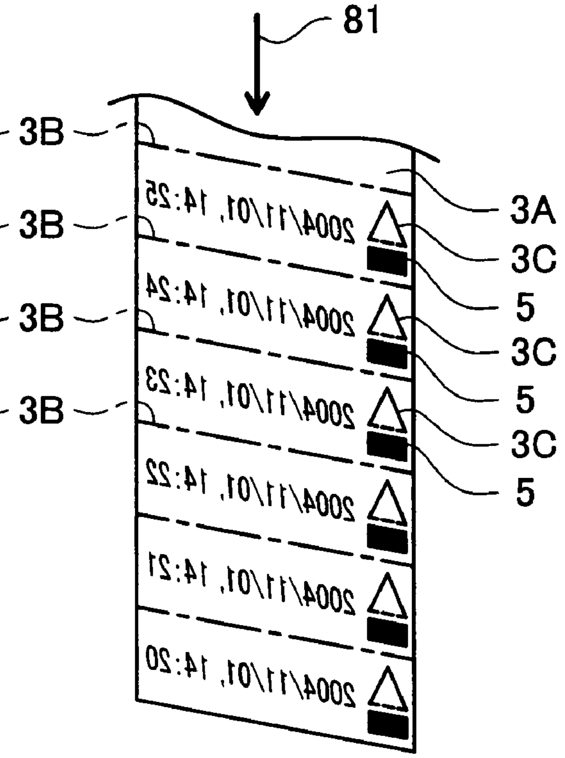
FIG. 7B is a schematic back view of the one example of the printed label produced by the roll sheet holder of the first exemplary embodiment.

As shown in FIGS. 7A and 7B, the print data including the expiration date and time of the item, such as "2004/11/01, 14:20", "2004/11/01, 14:21", "2004/11/01, 14:22" . . . "2004/11/01, 14:25" is imported from the external computer. Upon receipt of the print start command signal, the CPU 62 determines the feeding speed of the roll sheet 3A, the pitch size of the encoder mark 5 in the feeding direction, i.e., the length between the cutting lines 3B, and the presence of the slit 3C, for the roll sheet 3A set in the roll sheet holder 3 based on the detected information by the sheet discrimination sensors S1 to S5.

Consequently, the CPU 62 starts driving of the sheet feeding motor 72, and rotates the platen roller 26, and starts feeding of the roll sheet 3A at the feeding speed stored in the RAM 66 in a direction of an arrow 81. When the voltage of the output signal entered from the photo sensor 11 becomes the threshold voltage, the CPU 62 determines that the encoder mark 5 is opposite to the photo sensor 11, and the platen roller 26 is rotated by a predetermined number of revolutions until the roll sheet 3A is conveyed to the print start position. The print data stored in the printing buffer 66A, such as "2004/11/01, 14:20", "2004/11/01, 14:21", "2004/11/01, 14:22" . . . "2004/11/01, 14:25" is successively printed in the printable region inward from the slit 3C by way of the thermal head 31, in each feeding by the pitch of the encoder mark 5 in the feeding direction.

After feeding roll sheet 3A by a predetermined length from the moment of the voltage of the output signal entered from the photo sensor 11 reaching the threshold voltage, the CPU 62 further rotates the platen roller 26 by the predetermined number of revolutions in each sequential printing of the print output data until the cutting line 3B is conveyed to the position opposite to the cutter unit 8, and then stops the sheet feeding motor 72. Simultaneously, the CPU 62 drives the cutting motor 74 to move the cutter unit 8 across the roll sheet 3A reciprocatively, so that the printed part of the roll sheet 3A is cut along the cutting line 3B. After that, the CPU 62 starts driving the sheet feeding motor 72 again, and the left print data is successively printed by way of the thermal head 31, by the pitch of the encoder mark 5 in the feeding direction. Accordingly, as shown in FIG. 7C, printed labels 82 on which the print data is printed are sequentially produced.

Figure 7C:
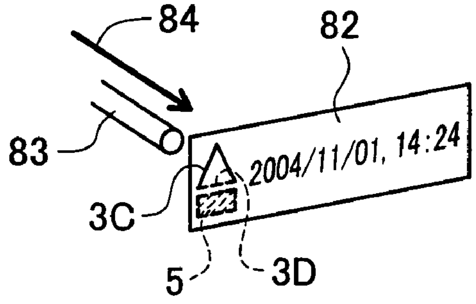
FIG. 7C is a schematic perspective view of the one example of the printed label produced by the roll sheet holder of the first exemplary embodiment, showing how to put on the printed label on a stick-type member.
Figure 7D:
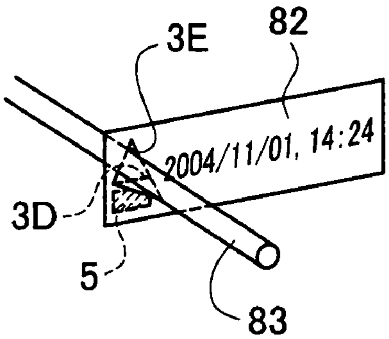
FIG. 7D is a perspective view of the printed label produced by the roll sheet holder of the first exemplary embodiment, showing how to put on the printed label on the stick-type member.

As shown in FIGS. 7C and 7D, the slit 3C of the printed label 82 is bent to the front surface thereof from a bend part 3D by being pressed by an end of a stick-type member 83 from the back-side surface, forming a insertion hole 3E of a substantially triangular shape as a insertion part. The stick-type member 83 is further inserted into the insertion hole 3E to a direction of an arrow 84, so that the printed label 82 on which "2004/11/01, 14:24" indicating the expiration date and time of the item is printed can be put on the stick-type member 83.

As a result of above, the printed label 82 on which the expiration date and time of the item is printed can be easily put on a stick, for instance, the stick of a frankfurter displayed on a shelf in a shop.

It is noted that the print data includes the date and time of manufacture, the price of an item, the name of the item, the country where the item is made, the name of a maker, the materials, the item number, and the like.

Therefore, when the roll sheet holder 3 of the first exemplary embodiment is set in the tape printer 1, the data corresponding to the kind of the roll sheet 3A is determined through the sensor holes 60A to 60E of the roll sheet discrimination part 60 and the sheet discrimination sensors S1 to S5. The photo sensor 11 detects the encoder mark 5 formed on the back surface of the roll sheet 3A after the sheet feeding motor 72 is driven to feed the roll sheet 3A. Based on the detected information, the platen roller 26, the sheet feeding motor 72, the thermal head 31 and the drive circuit 71 are driven and controlled to print the print data such as the expiration date and time of the item on the roll sheet 3A. The sheet feeding motor 72 is temporarily stopped after feeding the roll sheet 3A by the predetermined pitch size of the encoder marks 5. Simultaneously, the cutting motor 74 drives the cutter unit 8 across the roll sheet 3A reciprocatively, so that the printed part of the roll sheet 3A is cut along the cutting line 3B.

Accordingly, the printed label 82 on which the predetermined print data such as the expiration date and time of the item is printed and the slit 3C is formed, is automatically and successively produced. The stick-type member 83 is pressed with the end thereof to the back surface of the slit 3C of the printed label 82 to make the bent in the slit 3C from the bend part 3D, and is further inserted into the insertion hole 3E, so that the printed label 82 can be easily put on the stick-type member 83. Therefore, the printed label 82 on which the limit of eating, the date of manufacture and the like are printed can be quickly put on the stick-type member 82. Further, the roll sheet 3A is made of the thermal sheet without the adhesive layer on its back side. Therefore, the printed label 82 can be safely used in food items to be put on the stick-type member thereof. Also, the printed label 82 can be completely removed from the stick-type member 83 without any adhesive left.

Furthermore, the slit 3C is formed like a dog-leg shape projecting backward in the feeding direction. The slit is not formed on a front edge side of the slit 3C in the feeding direction. Therefore, the roll sheet 3A can be prevented from getting caught in the insertion port 18 of the roll sheet 3A and at an entry of the thermal head 31 of the tape printer 1, and thus the roll sheet 3A can be fed smoothly providing a high-quality printing.

Second Exemplary Embodiment

Next, the roll sheet holder of a second exemplary embodiment will be explained with reference to FIGS. 8A and 8B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the second exemplary embodiment are substantially same as those of the roll sheet holder 3 and the tape printer 1 of the first exemplary embodiment. Also, a control structure and a control process of the tape printer of the second exemplary embodiment are same as those of the printer 1 of the first exemplary embodiment.

However, the roll sheet 3A of the second exemplary embodiment is different from the roll sheet 3A of the first exemplary embodiment in having a through hole into which the stick-type member 83 can be inserted, instead of the slit 3C of the roll sheet 3A of the first exemplary embodiment.

Figure 8A:
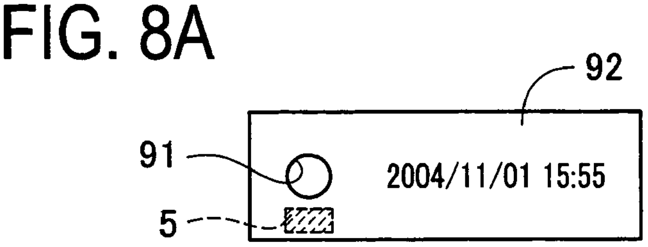
FIG. 8A is a schematic front view of one example of a printed label produced by a roll sheet holder of a second exemplary embodiment.

As shown in FIG. 8A, the roll sheet 3A in the roll sheet holder 3 has a through hole 91 into which the stick-type member 83 can be inserted, instead of the slit 3C of the roll sheet 3A of the first exemplary embodiment. Accordingly, a printed label 92 which is printed with the predetermined print data such as the expiration date and time of the item, and cut along the cutting line 3B has the through hole 91 into which the stick-type member 83 can be inserted at the left side end.

For instance, as shown in FIG. 8A, the through hole 91 into which the stick-type member 83 can be inserted is formed at the left side end of the printed label 92 on which "2004/11/01 15:55" indicating the expiration date and time of the item is printed.

Figure 8B:
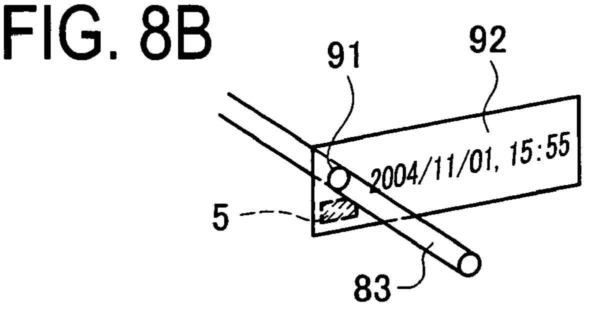
FIG. 8B is a schematic perspective view of the printed label produced by the roll sheet holder of the second exemplary embodiment, showing how to put on the printed label on the stick-type member.

As shown in FIG. 8B, the end of the stick-type member 83 can be inserted into the through hole 91 from the back side, so that the printed label 92 on which "2004/11/01 15:55" indicating the expiration date and time of the item is printed can be easily put on the stick-type member 83.

Accordingly, when the roll sheet holder 3 of the second exemplary embodiment is set in the tape printer 1, the through hole 91 into which the stick-type member 83 is insertable is formed at the left side end of the printed label 92 on which the expiration date and time of the item is printed. Therefore, the end of the stick-type member 83 is inserted into the through hole 91 from the back side, so that the printed label 92 can be easily put on the stick-type member 83. Further, the roll sheet 3A is made of the thermal sheet without the adhesive layer on its back side. Therefore, the printed label 92 can be safely used in food items to be put on the stick-type member thereof. Also, the printed label 92 can be completely removed from the stick-type member 83 without any adhesive left.

It is noted that a size of the through hole 91 is preferably a little smaller than a cross-sectional area of the stick-type member 83. In this case, the stick-type member 83 is forcibly inserted into the through hole 91, so that the printed label 92 can be put on the stick-type member 83. Further, the printed label 92 can be avoided being slipped off the stick-type member 83 by friction between the printed label 92 and the stick-type member 83.

Each through hole 91 is formed behind the encoder mark 5 in the feeding direction. However, the through hole 91 may be formed on the side opposite to the encoder mark 5. With this arrangement, the through hole 91 into which the stick-type member 83 can be inserted is formed on the right side of the printed label 92.

Third Exemplary Embodiment

Next, the roll sheet holder of a third exemplary embodiment will be explained with reference to FIGS. 9A and 9B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the third exemplary embodiment are substantially same as those of the roll sheet holder 3 and the tape printer 1 of the first exemplary embodiment. Also, a control structure and a control process of the tape printer of the third exemplary embodiment are same as those of the printer 1 of the first exemplary embodiment.

However, the roll sheet 3A of the third exemplary embodiment is different from the roll sheet 3A of the first exemplary embodiment in having a through hole which is smaller than the cross-sectional area of the stick-type member 83, instead of the slit 3C of the roll sheet 3A of the first exemplary embodiment.

Figure 9A:
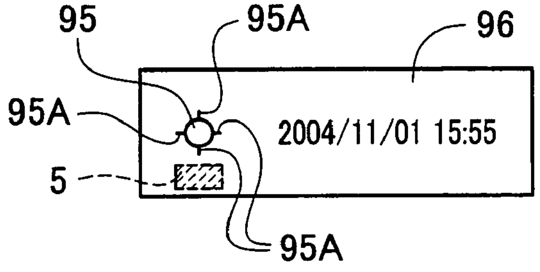
FIG. 9A is a schematic front view of one example of a printed label produced by a roll sheet holder of a third exemplary embodiment.

As shown in FIG. 9A, the roll sheet 3A in the roll sheet holder 3 has a through hole 95 which is smaller than the cross-sectional area of the stick-type member 83, instead of the slit 3C of the roll sheet 3A of the first exemplary embodiment. Four slits 95A of predetermined lengths (for instance, 2 mm to 5 mm) are formed on a periphery of the through hole 95 at intervals of about 90° central angles, extending outward in a radius direction. Accordingly, the through hole 95 which is smaller than the cross-sectional area of the stick-type member 83 is formed at the left side end of a printed label 96 which is printed with the predetermined print data such as the expiration date and time of the item is printed, and cut along the cutting line 3B.

For instance, as shown in FIG. 9A, the through hole 95 which is smaller than the cross-sectional area of the stick-type member 83 is formed at the left side end of the printed label 96 on which "2004/11/01 15:55" indicating the expiration date and time of the item is printed. Further, the four slits 95A are formed on the periphery of the through hole 95.

Figure 9B:
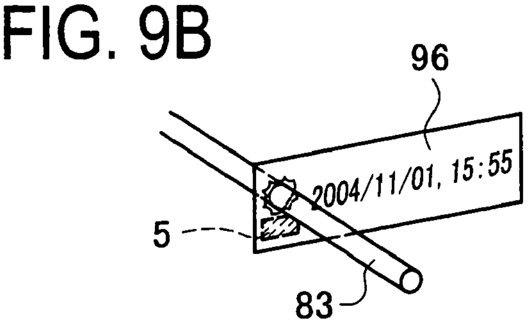
FIG. 9B is a schematic perspective view of the printed label produced by the roll sheet holder of the third exemplary embodiment, showing how to put on the printed label on the stick-type member.

As shown in FIG. 9B, the end of the stick-type member 83 is pressed on the through hole 95 from the back side, and thereby the outer rim of the through hole 95 is expanded to the front face of the printed label 96 while the slits 95A become open. The stick-type member 83 is further pressed into the through hole 95, so that the printed label 96 on which "2004/11/01 15:55" indicating the expiration date and time of the item is printed can be easily put on the stick-type member 83.

Accordingly, when the roll sheet holder 3 of the third exemplary embodiment is set in the tape printer 1, the through hole 95 which is smaller than the cross-sectional area of the stick-type member 83 is formed at the left side end of the printed label 96. Further, the four slits 95A are formed on the periphery of the through hole 95. Therefore, the stick-type member 83 can be easily inserted into the through-hole 95 from the back side, even though the through-hole 95 is smaller than the diameter of the stick-type member 83. With the four slits 95A formed on the periphery of the through hole 95, the stick-type member 83 can be inserted into the through hole 95 without ripping the printed label 96. Accordingly, the printed label 96 can be securely put on the stick-type member 83. Additionally, the stick-type member 83 can widen the four slits 95A to be inserted into the through hole 95, so that the printed label 96 can be put on the stick-type member 83. Also, the printed label 96 can be avoided being slipped off the stick-type member 83 by friction between the printed label 96 and the stick-type member 83. Further, the roll sheet 3A is made of the thermal sheet without the adhesive layer on its back side, so that the printed label 96 can be safely used to be put on stick-type members of items such as foods. It is also possible to produce the printed label 96 which can be completely removed from the stick-type member 83 without any adhesive left. Furthermore, the through-hole 95 can be smaller, so that the roll sheet 3A can be prevented from getting caught in the insertion port 18 of the roll sheet 3A and at the entry of the thermal head 31 of the tape printer 1, and thus the roll sheet 3A can be fed smoothly, providing the high-quality printing.

The through hole 95 and the slits 95A are formed behind the encoder mark 5 in the feeding direction. However, the through hole 95 and the slits 95A may be formed on the side opposite to the encoder mark 5. With this arrangement, the through hole 95 and the slits 95A into which the stick-type member 83 can be inserted is formed at the right side end of the printed label 96.

Fourth Exemplary Embodiment

Next, the roll sheet holder of a fourth exemplary embodiment will be explained with reference to FIGS. 10A and 10B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the fourth exemplary embodiment are substantially same as those of the roll sheet holder 3 and the tape printer 1 of the first exemplary embodiment. Also, a control structure and a control process of the tape printer of the fourth exemplary embodiment are same as those of the printer 1 of the first exemplary embodiment.

However, the roll sheet 3A of the fourth exemplary embodiment is different from the roll sheet 3A of the first exemplary embodiment in having a through hole into which the stick-type member 83 can be inserted at both side ends of the roll sheet 3A, instead of the slit 3C of the roll sheet 3A of the first exemplary embodiment.

Figure 10A:
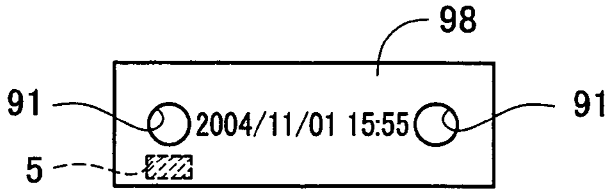
FIG. 10A is a schematic front view of one example of a printed label produced by a roll sheet holder of a fourth exemplary embodiment.

As shown in FIG. 10A, the roll sheet 3A in the roll sheet holder 3 has through holes 91 into which the stick-type member 83 can be inserted instead of the slit 3C of the roll sheet 3A of the first exemplary embodiment. One of the through hole 91 provided behind the encoder mark 5 in the feeding direction, and the other through hole 91 provided at the other side end of the roll sheet 3A are symmetrically with respect to a center line in the width direction, Accordingly, a printed label 98 which is printed with the predetermined print data such as the expiration date and time of the item, and cut along the cutting line 3B has the through holes 91 into which the stick-type member 83 can be inserted at both side ends.

For instance, as shown in FIG. 10A, the through holes 91 into which the stick-type member 83 can be inserted are formed at both side ends of the printed label 98 on which "2004/11/01 15:55" indicating the expiration date and time of the item is printed.

Figure 10B:
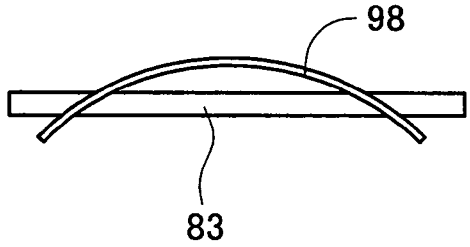
FIG. 10B is a schematic perspective view of the printed label produced by the roll sheet holder of the fourth exemplary embodiment, showing how to put on the printed label on the stick-type member.

As shown in FIG. 10B, the stick-type member 83 can be inserted into the through holes 91 from the side while the printed label 98 is warped toward the front face side. As a result of this, the printed label 98 on which "2004/11/01

15:55" indicating the expiration date and time of the item is printed can be easily put on the stick-type member 83.

Accordingly, when the roll sheet holder 3 of the fourth exemplary embodiment is set in the tape printer 1, the through holes 91 are formed at both side ends of the printed label 98. The stick-type member 83 can be inserted into the through holes 91 from the side while the printed label 98 is warped toward the front face side, and thereby the printed label 98 can be easily put on the stick-type member 83. Further, the printed label 98 can be avoided being slipped off the stick-type member 83 by an elastic stability thereof. Additionally, the roll sheet 3A is made of the thermal sheet without the adhesive layer on its back side. Therefore, the printed label 98 can be safely used in food items to be put on the stick-type member thereof. Also, the printed label 98 can be completely removed from the stick-type member 83 without any adhesive left.

It is noted that the size of each through hole 91 is preferably a little smaller than the cross-sectional area of the stick-type member 83. In this case, the stick-type member 83 is forcibly inserted into the through holes 91, so that the printed label 98 can be put on the stick-type member 83, and avoided being slipped off the stick-type member 83.

Fifth Exemplary Embodiment

Next, the roll sheet holder of a fifth exemplary embodiment will be explained with reference to FIGS. 11A and 11B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the fifth exemplary embodiment are substantially same as those of the roll sheet holder 3 and the tape printer 1 of the first exemplary embodiment. Also, a control structure and a control process of the tape printer of the fifth exemplary embodiment are same as those of the printer 1 of the first exemplary embodiment.

However, the roll sheet 3A of the fifth exemplary embodiment is different from the roll sheet 3A of the first exemplary embodiment in having two parallel lines of slits formed with a predetermined space therebetween in the width direction of the roll sheet 3A, instead of the slit 3C of the roll sheet 3A of the first exemplary embodiment.

Figure 11A:
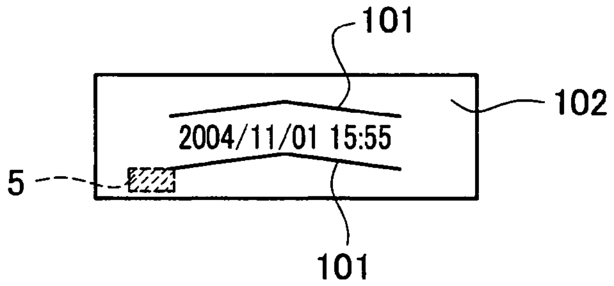
FIG. 11A is a schematic front view of one example of a printed label produced by a roll sheet holder of a fifth exemplary embodiment.

As shown in FIG. 11A, the roll sheet 3A of the roll sheet holder 3 has two parallel lines of slits 101 formed like a dog leg, projecting backward in the feeding direction in top view, substantially at the center of the width of the roll sheet 3A. Between the two slits 101, there is formed a space in which the expiration date and time of the item can be printed. Accordingly, a printed label 102 on which the predetermined print data such as the expiration date and time of the item is printed and cut along the cutting line 3B has the two parallel lines of the dog-leg shaped slits 101 projecting backward in the feeding direction.

For instance, as shown in FIG. 11A, the dog-leg shaped slits 101 projecting backward are formed above and below the printed part on which "2004/11/01 15:55" indicating the expiration date and time of the item is printed on the printed label 102.

Figure 11B:
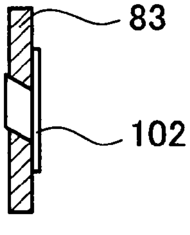
FIG. 11B is a schematic perspective view of the printed label produced by the roll sheet holder of the fifth exemplary embodiment, showing how to put on the printed label on the stick-type member.

As shown in FIG. 11B, the printed part, on which the "2004/11/01 15:55" indicating the expiration date and time of the item is printed, is pushed up from the back side to the front side of the printed label 102, and the stick-type member 83 is inserted into the space behind the printed part. As a result of this, the printed label 102 on which "2004/11/01 15:55" indicating the expiration date and time of the item is printed can be easily put on the stick-type member 83.

Accordingly, when the roll sheet holder 3 of the fifth exemplary embodiment is set in the tape printer 1, the stick-type member 83 is inserted into the slits 101 of the printed label 102 in which the expiration date and time of the item is printed, and thereby the printed label 102 can be easily put on the stick-type member 83. Further, the dog-leg shaped slits 101 are formed protruding backward in the feeding direction in top view. Therefore, the roll sheet 3A can be prevented from getting caught in the insertion port 18 of the roll sheet 3A and at the entry of the thermal head 31 of the tape printer 1, and thereby the roll sheet 3A can be fed smoothly, providing a high-quality printing. Additionally, the roll sheet 3A is made of the thermal sheet without the adhesive layer on its back side. Therefore, the printed label 102 can be safely used in food items to be put on the stick-type member thereof. Also, the printed label 102 can be completely removed from the stick-type member 83 without any adhesive left.

Sixth Exemplary Embodiment

Next, the roll sheet holder of a sixth exemplary embodiment will be explained with reference to FIGS. 12A and 12B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the sixth exemplary embodiment are substantially same as those of the roll sheet holder 3 and the tape printer 1 of the first exemplary embodiment. Also, a control structure and a control process of the tape printer of the sixth exemplary embodiment are same as those of the printer 1 of the first exemplary embodiment.

However, the roll sheet 3A of the sixth exemplary embodiment is different from the roll sheet 3A of the first exemplary embodiment in having two parallel perforated lines which are as long as or a little longer than the maximum diameter of the stick-type member 83, formed in the width direction of the roll sheet 3A with a predetermined space therebetween, instead of the slit 3C of the roll sheet 3A of the first exemplary embodiment.

Figure 12A:
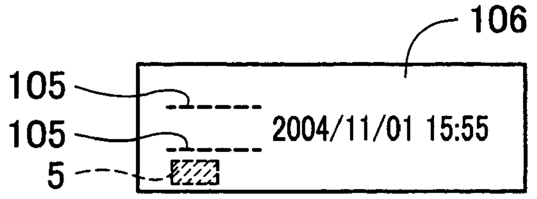
FIG. 12A is a schematic front view of one example of a printed label produced by a roll sheet holder of a sixth exemplary embodiment.

As shown in FIG. 12A, the roll sheet 3A in the roll sheet holder 3 has two parallel perforated lines 105 of a predetermined length (for instance, three-times length of the maximum diameter of the stick-type member 83) formed along the width direction of the roll sheet 3A, behind the encoder mark 5 in the feeding direction with the predetermined space therebetween (for instance, the length equal to the height of the printed characters, or the one-third length of the length between the cutting lines 3B). Accordingly, a printed label 106 which is printed with the predetermined print data such as the expiration date and time of the item, and cut along the cutting line 3B has the two parallel perforated lines 105 formed behind the encoder mark 5 in the feeding direction at the left side end.

For instance, as shown in FIG. 12A, the two parallel perforated lines 105 are formed at the left side end of the printed label 106 on which "2004/11/01 15:55" indicating the expiration date and time of the item is printed.

Figure 12B:
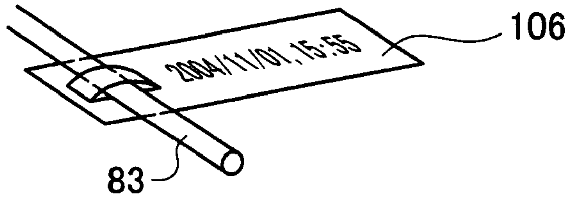
FIG. 12B is a schematic perspective view of the printed label produced by the roll sheet holder of the sixth exemplary embodiment, showing how to put on the printed label on the stick-type member.

As shown in FIG. 12B, the part between the two perforated lines is pushed up from the back side to the front side of the printed label 106, and thereby the stick-type member 83 can be inserted into a space behind the part pushed up. As a result of this, the printed label 106 on which "2004/11/01 15:55"

indicating the expiration date and time of the item is printed can be easily put on the stick-type member 83.

Accordingly, when the roll sheet holder 3 of the sixth exemplary embodiment is set in the tape printer 1, the stick-type member 83 is inserted into the space behind the pushed-up part between the two perforated lines of the printed label 106 on which the expiration date and time of the item is printed, so that the printed label 106 can be easily put on the stick-type member 83. Further, the perforated lines 105 are not yet torn off during the printing operation. Therefore, the roll sheet 3A can be prevented from getting caught in the insertion port 18 of the roll sheet 3A and at the entry of the thermal head 31 of the tape printer 1, and thus the roll sheet 3A can be fed smoothly, providing a high-quality printing. Additionally, the roll sheet 3A is made of the thermal sheet without the adhesive layer on its back side. Therefore, the printed label 106 can be safely used in food items to be put on the stick-type member thereof. Also, the printed label 106 can be completely removed from the stick-type member 83 without any adhesive left.

It is noted that the perforated lines 105 are formed behind the encoder mark 5 in the feeding direction, but may be provided at the end opposite to the encoder mark 5. As a result of this, the perforated lines 105 are formed at the right side end of the printed label 106.

Seventh Exemplary Embodiment

Next, the roll sheet holder of a seventh exemplary embodiment will be explained with reference to FIGS. 13A and 13B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the seventh exemplary embodiment are substantially same as those of the roll sheet holder 3 and the tape printer 1 of the first exemplary embodiment. Also, a control structure and a control process of the tape printer of the seventh exemplary embodiment are same as those of the printer 1 of the first exemplary embodiment.

However, the roll sheet 3A of the seventh exemplary embodiment is different from the roll sheet 3A of the first exemplary embodiment in having two parallel perforated lines formed along the width direction of the roll sheet 3A with a predetermined space therebetween instead of the slit 3C of the roll sheet 3A of the first exemplary embodiment.

Figure 13A:
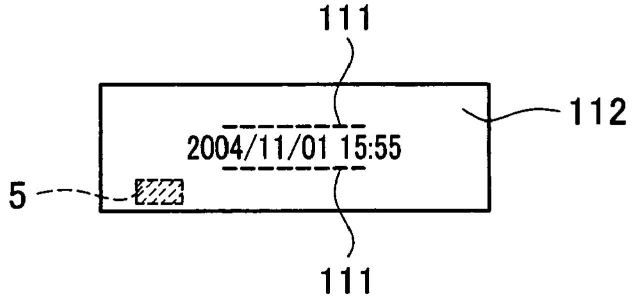
FIG. 13A is a schematic front view of one example of a printed label produced by a roll sheet holder of a seventh exemplary embodiment.

As shown in FIG. 13A, the roll sheet 3A in the roll sheet holder 3 has two parallel perforated lines 111 formed along the width direction of the roll sheet 3A substantially at the center of the width of the roll sheet 3A, being able to be torn off. A part between the two perforated lines 111 can be printed with the print data such as the expiration date and time of the item. Accordingly, a printed label 112 which is printed with the predetermined print data such as the expiration date and time of the item, and cut along the cutting line 3B has the two parallel perforated lines 111.

For instance, as shown in FIG. 13A, the parallel perforated lines 111 are formed above and below the printed part of the printed label 112 on which "2004/11/01 15:55" indicating the expiration date and time of the item is printed.

Figure 13B:
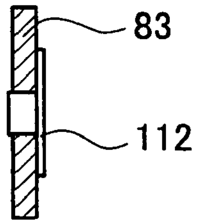
FIG. 13B is a schematic perspective view of the printed label produced by the roll sheet holder of the seventh exemplary embodiment, showing how to put on the printed label on the stick-type member.

As shown in FIG. 13B, the printed part on which the "2004/11/01 15:55" indicating the expiration date and time of the item is printed is pushed up from the back side to the front side of the printed label 106, and thereby the stick-type member 83 can be inserted into a space behind the printed part which is pushed up. As a result of this, the printed label 112 on which "2004/11/01 15:55" indicating the expiration date and time of the item is printed can be easily put on the stick-type member 83.

Accordingly, when the roll sheet holder 3 of the seventh exemplary embodiment is set in the tape printer 1, the stick-type member 83 is inserted into the space behind the pushed-up part between the two perforated lines of the printed label 112 on which the expiration date and time of the item is printed, and thereby the printed label 112 can be easily put on the stick-type member 83. Further, the perforated lines 111 are not yet torn off during the printing operation. Therefore, the roll sheet 3A can be prevented from getting caught in the insertion port 18 of the roll sheet 3A and at the entry of the thermal head 31 of the tape printer 1, and thus the roll sheet 3A can be fed smoothly, providing a high-quality printing. Additionally, the roll sheet 3A is made of the thermal sheet without the adhesive layer on its back side. Therefore, the printed label 112 can be safely used in food items to be put on the stick-type member thereof. Also, the printed label 112 can be completely removed from the stick-type member 83 without any adhesive left.

Eighth Exemplary Embodiment

Next, the roll sheet holder of an eighth exemplary embodiment will be explained with reference to FIGS. 14A and 14B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the eighth exemplary embodiment are substantially same as those of the roll sheet holder 3 and the tape printer 1 of the first exemplary embodiment. Also, a control structure and a control process of the tape printer of the eighth exemplary embodiment are same as those of the printer 1 of the first exemplary embodiment.

However, the roll sheet 3A of the eighth exemplary embodiment is different from the roll sheet 3A of the first exemplary embodiment in having a through hole into which the stick-type member 83 can be inserted, and an insertion guide hole of a inverted trapezoidal shape extending from the periphery of the through hole to the rear cutting line 3B in the feeding direction, instead of the slit 3C of the roll sheet 3A of the first exemplary embodiment.

Figure 14A:
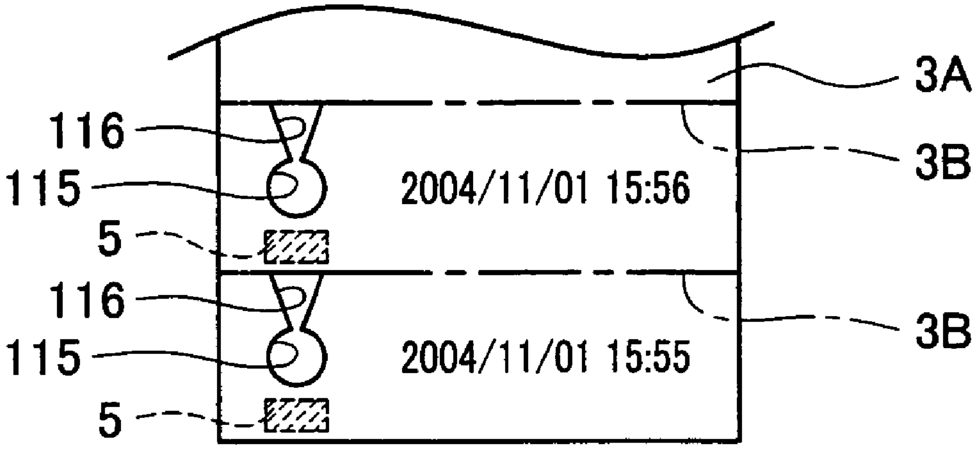
FIG. 14A is a schematic front view of one example of a printed label produced by a roll sheet holder of an eighth exemplary embodiment.

As shown in FIG. 14A, the roll sheet 3A in the roll sheet holder 3 has a through hole 115 into which the stick-type member 83 can be inserted, and an insertion guide hole 116 of an inverted trapezoidal shape extending from the periphery of the through hole 115 to the rear cutting line 3B in the feeding direction, instead of the slit 3C of the roll sheet 3A of the first exemplary embodiment.

For instance, as shown in FIG. 14A, the through hole 115 into which the stick-type member 83 can be inserted, and the insertion guide hole 116 of the inverted trapezoidal shape extending from the periphery of the through hole 115 to the rear cutting line 3B in the feeding direction, are formed above the encoder mark 5 of the roll sheet 3A on which "2004/11/01 15:55" and "2004/11/01 15:56" indicating the expiration date and time of the item are printed.

Figure 14B:
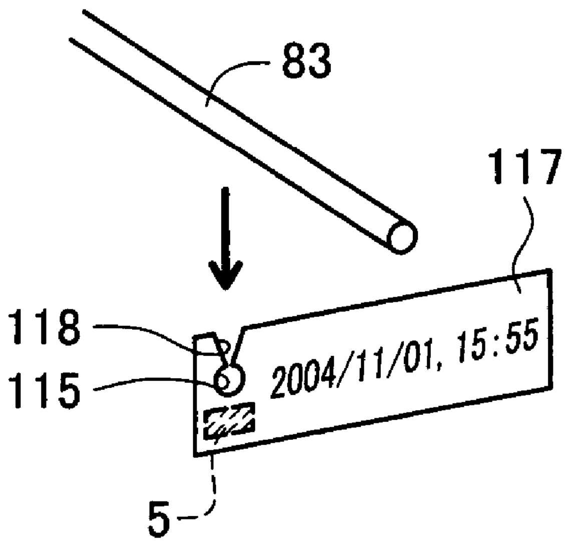
FIG. 14B is a schematic perspective view of the printed label produced by the roll sheet holder of the eighth exemplary embodiment, showing how to put on the printed label on the stick-type member.

As shown in FIG. 14B, the roll sheet 3A on which "2004/11/01 15:55" and "2004/11/01 15:56" indicating the expiration date and time of the item is printed is successively cut along the cutting lines 3B, so that printed labels 117 are produced. At the left side end of the printed label 117 cut along the cutting line 3B, the through hole 115 into which the stick-type member 83 can be inserted is formed. Contiguous to the through hole 115, there is also formed an opening part 118 of an inverted trapezoidal shape by which the stick-type member 83 is led to insert therein, opening at the rear end of the printed label 117.

Accordingly, the stick-type member 83 is pressed into the opening part 118 of the printed label 117, and thereby the stick-type member 83 can be inserted into the through hole 115. As a result of this, the printed label 117 on which "2004/11/01 15:55" indicating the expiration date and time of the item is printed can be easily put on the stick-type member 83.

Accordingly, when the roll sheet holder 3 of the eighth exemplary embodiment is set in the tape printer 1, the through hole 115 into which the stick-type member 83 can be inserted is formed at the left side end of the printed label 117 on which the expiration date and time of the item is printed. Contiguous to the through hole 115, the opening part 118 of the inverted trapezoidal shape by which the stick-type member 83 is guided to insert therein is formed, opening at the rear end of the printed label 117. With this arrangement, the stick-type-member 83 can be forcibly inserted into the opening part 118, so that the printed label 117 can be easily put on the stick-type member 83. Further, the roll sheet 3A is made of the thermal sheet without the adhesive layer on its back side. Therefore, the printed label 117 can be safely used in food items to be put on the stick-type member thereof. Also, the printed label 117 can be completely removed from the stick-type member 83 without any adhesive left.

It is noted that a size of the through hole 115 is preferably a little smaller than the cross-sectional area of the stick-type member 83. In this case, the stick-type member 83 is forcibly inserted into the through hole 115, so that the printed label 117 can be put on the stick-type member 83. Further, the printed label 117 can be avoided being slipped off the stick-type member 83 by friction between the printed label 117 and the stick-type member 83.

The through hole 115 and the insertion guide hole 116 are formed behind the encoder mark 5 in the feeding direction. However, the through hole 115 and the insertion guide hole 116 may be formed on the side opposite to the encoder mark 5. With this arrangement, the through hole 115 and the insertion guide hole 116 into which the stick-type member 83 can be inserted are formed at the right side end of the printed label 117.

Ninth Exemplary Embodiment

Next, the roll sheet holder of a ninth exemplary embodiment will be explained with reference to FIGS. 15A and 15B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the ninth exemplary embodiment are substantially same as those of the roll sheet holder 3 and the tape printer 1 of the first exemplary embodiment. Also, a control structure and a control process of the tape printer of the ninth exemplary embodiment are same as those of the printer 1 of the first exemplary embodiment.

However, the roll sheet 3A of the ninth exemplary embodiment is different from the roll sheet 3A of the first exemplary embodiment in having a through hole into which the stick-type member 83 can be inserted, and a perforated line extending from a periphery of the through hole to the rear cutting line 3B in the feeding direction, instead of the slit 3C of the roll sheet 3A of the first exemplary embodiment.

Figure 15A:
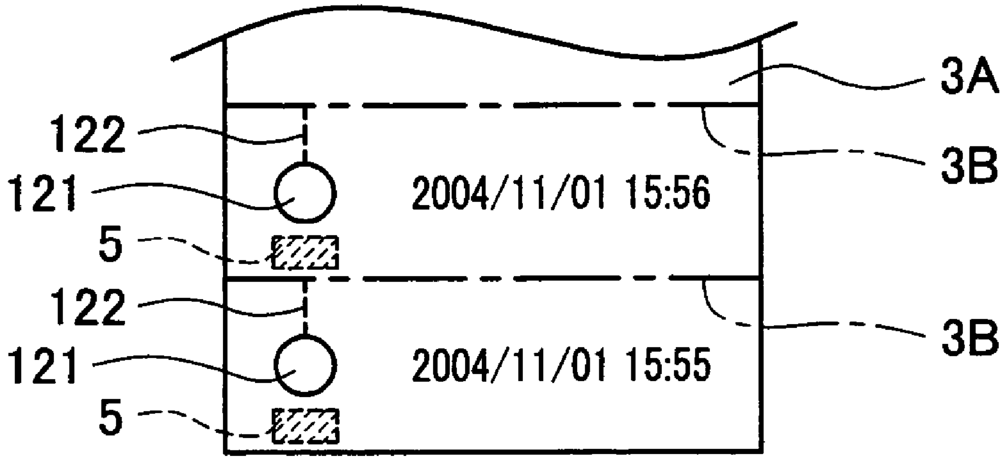
FIG. 15A is a schematic front view of one example of a printed label produced by a roll sheet holder of a ninth exemplary embodiment.

As shown in FIG. 15A, the roll sheet 3A in the roll sheet holder 3 has a through hole 121 into which the stick-type member 83 can be inserted, and a perforated line 122 extending from a periphery of the through hole 121 to the rear cutting line 3B in the feeding direction, instead of the slit 3C of the roll sheet 3A of the first exemplary embodiment.

For instance, as shown in FIG. 15A, the through hole 121 into which the stick-type member 83 can be inserted, and the perforated line 122 extending from the periphery of the through hole 121 to the rear cutting line 3B along the feeding direction, are formed above the encoder mark 5 of the roll sheet 3A on which "2004/11/01 15:55" and "2004/11/01 15:56" indicating the expiration date and time of the item are printed.

Figure 15B:
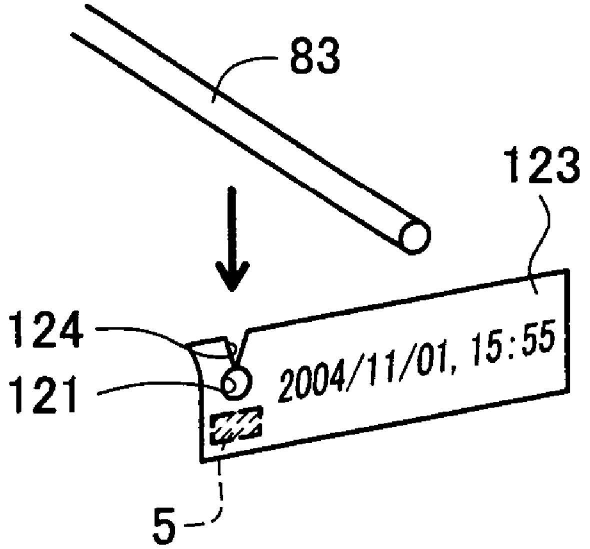
FIG. 15B is a schematic perspective view of the printed label produced by the roll sheet holder of the ninth exemplary embodiment, showing how to put on the printed label on the stick-type member.

As shown in FIG. 15B, the roll sheet 3A on which "2004/11/01 15:55" and "2004/11/01 15:56" indicating the expiration date and time of the item are printed is successively cut along the cutting lines 3B, so that printed labels 123 are produced. At the left side end of the printed label 123 cut along the cutting line 3B, the through hole 121 into which the stick-type member 83 can be inserted, and the perforate line 122 extending from the periphery of the through hole 121 to the upper side end are formed.

Accordingly, the stick-type member 83 is pressed into an opening part 124 which is formed of the torn-off perforated line 122 of the printed label 123, and thereby the stick-type member 83 can be inserted into the through hole 121. As a result of this, the printed label 123 on which "2004/11/01 15:55" indicating the expiration date and time of the item is printed can be easily put on the stick-type member 83.

Accordingly, when the roll sheet holder 3 of the ninth exemplary embodiment is set in the tape printer 1, the through hole 121 into which the stick-type member 83 can be inserted, and the perforated line 122 extending from the periphery of the through hole 121 to the upper side end are formed at the left side end of the printed label 123 on which the expiration date and time of the item is printed. The stick-type member 83 is pressed into the opening part 124 which is formed of the torn-off perforated line 122 of the printed label 123, and thereby the stick-type member 83 can be easily put on the stick-type member 83. Further, the roll sheet 3A is made of the thermal sheet without the adhesive layer on its back side. Therefore, the printed label 123 can be safely used in food items to be put on the stick-type member thereof. Also, the printed label 123 can be completely removed from the stick-type member 83 without any adhesive left.

It is noted that a size of the through hole 121 is preferably a little smaller than the cross-sectional area of the stick-type member 83. In this case, the stick-type member 83 is forcibly inserted into the through hole 121, so that the printed label 123 can be put on the stick-type member 83. Further, the printed label 123 can be avoided being slipped off the stick-type member 83 by friction between the printed label 123 and the stick-type member 83.

The through hole 121 and the perforated line 122 are formed behind the encoder mark 5 in the feeding direction. However, the through hole 121 and the perforated line 122 may be formed on the side opposite to the encoder mark 5. With this arrangement, the through hole 121 and the perforated line 122 into which the stick-type member 83 can be inserted are formed at the right side end of the printed label 123.

Tenth Exemplary Embodiment

Next, the roll sheet holder of a tenth exemplary embodiment will be explained with reference to FIGS. 16A and 16B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the tenth exemplary embodiment are substantially same as those of the roll sheet holder 3 and the tape printer 1 of the first exemplary embodiment. Also, a control structure and a control process of the tape printer of the tenth exemplary embodiment are same as those of the printer 1 of the first exemplary embodiment.

However, the roll sheet 3A of the tenth exemplary embodiment is different from the roll sheet 3A of the first exemplary embodiment in having a through hole into which the stick-type member 83 can be inserted, and a slit-shaped insertion guide hole extending from a periphery of the through hole to a rear cutting line in the feeding direction, instead of the slit 3C of the roll sheet 3A of the first exemplary embodiment.

Figure 16A:
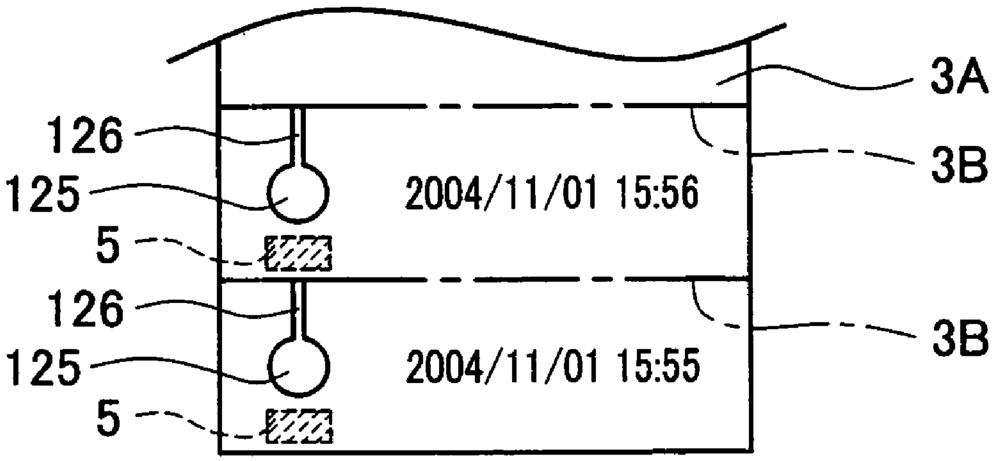
FIG. 16A is a schematic front view of one example of a printed label produced by a roll sheet holder of a tenth exemplary embodiment.

As shown in FIG. 16A, the roll sheet 3A in the roll sheet holder 3 has a through hole 125 into which the stick-type member 83 can be inserted, and a slit-shaped insertion guide hole 126 extended from a circumference of the through hole 125 to the rear cutting line 3B in the feeding direction, instead of the slit 3C of the roll sheet 3A of the first exemplary embodiment.

For instance, as shown in FIG. 16A, the through hole 125 into which the stick-type member 83 can be inserted, and the slit-shaped insertion guide hole 126 extending from the periphery of the through hole 125 to the rear cutting line 3B in the feeding direction, are formed above the encoder mark 5 of the roll sheet 3A on which “2004/11/01 15:55” and “2004/11/01 15:56” indicating the expiration date and time of the item are printed.

Figure 16B:
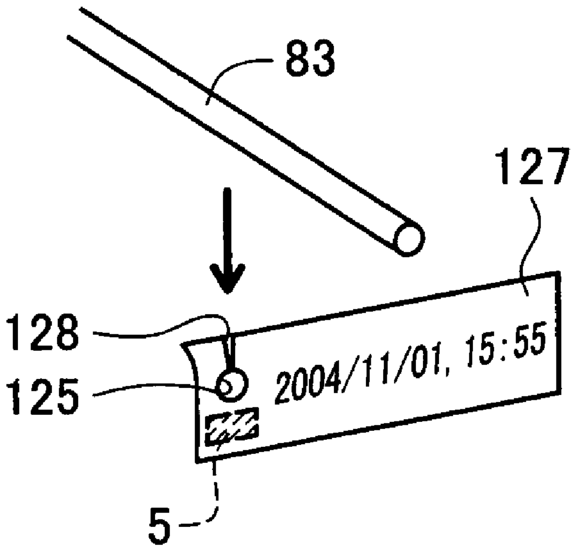
FIG. 16B is a schematic perspective view of the printed label produced by the roll sheet holder of the tenth exemplary embodiment, showing how to put on the printed label on the stick-type member.

As shown in FIG. 16B, the roll sheet 3A on which “2004/11/01 15:55” and “2004/11/01 15:56” indicating the expiration date and time of the item are printed is successively cut along the cutting lines 3B, so that printed labels 127 are produced. At the left side end of the printed label 127 cut along the cutting line 3B, the through hole 125 into which the stick-type member 83 can be inserted, are formed. Contiguous to the through hole 125, there is also formed a slit-shaped opening part 128 by which the stick-type member 3 is led to insert therein, opening at the rear end of the printed label 127.

Accordingly, the stick-type member 83 is pressed into the slit-shaped opening part 128 of the printed label 127 as the open-sided hole, and thereby the stick-type member 83 can be inserted into the through hole 125. As a result of this, the printed label 127 on which “2004/11/01 15:55” indicating the expiration date and time of the item is printed can be easily put on the stick-type member 83.

Accordingly, when the roll sheet holder 3 of the tenth exemplary embodiment is set in the tape printer 1, the through hole 125 into which the stick-type member 83 can be inserted, and the slit-shaped opening part 128 by which the stick-type member 83 is guided to insert therein, contiguous to the through hole 125, opening at the rear end of the printed label 127, are formed at the left side end of the printed label 127 on which the expiration date and time of the item is printed, and thereby the printed label 127 can be easily put on the stick-type member 83. The stick-type member 83 is pressed into the opening part 128, and thereby the stick-type member 83 can be easily put on the stick-type member 83. Further, the roll sheet 3A is made of the thermal sheet without the adhesive layer on its back side. Therefore, the printed label 127 can be safely used in food items to be put on the stick-type member thereof. Also, the printed label 127 can be completely removed from the stick-type member 83 without any adhesive left.

It is noted that a size of the through hole 125 is preferably a little smaller than the cross-sectional area of the stick-type member 83. In this case, the stick-type member 83 is forcibly inserted into the through hole 125, so that the printed label 127 can be put on the stick-type member 83. Further, the printed label 127 can be avoided being slipped off the stick-type member 83 by friction between the printed label 127 and the stick-type member 83.

Each through hole 125 and the insertion guide hole 126 are formed behind the encoder mark 5 in the feeding direction. However, the through hole 125 and the insertion guide hole 126 may be formed on the side opposite to the encoder mark 5. With this arrangement, the through hole 125 into which the stick-type member 83 can be inserted and the insertion guide hole 126 are formed at the right side end of the printed label 127.

Eleventh Exemplary Embodiment

Next, the roll sheet holder of an eleventh exemplary embodiment will be explained with reference to FIGS. 17 to 26B. Hereinafter, the identical reference numerals to those of the roll sheet holder 3 and the tape printer 1 of the first exemplary embodiment indicate an identical or corresponding part of the roll sheet holder 3 and the tape printer 1 of the first exemplary embodiment.

Whole structures of the roll sheet holder and the tape printer of the eleventh exemplary embodiment are substantially same as those of the roll sheet holder 3 and the tape printer 1 of the first exemplary embodiment. Also, a control structure and a control process of the tape printer of the eleventh exemplary embodiment are same as those of the printer 1 of the first exemplary embodiment.

However, the roll sheet 130 of the eleventh exemplary embodiment is different from the roll sheet 3A of the first exemplary embodiment in having a hexagonal through hole substantially long in the tape width direction, into which the stick-type member 83 is inserted, formed at one side end of the roll sheet with a predetermined pitch size, instead of the slit 3C and the encoder mark 5 of the roll sheet 3A of the first exemplary embodiment.

Figure 17:
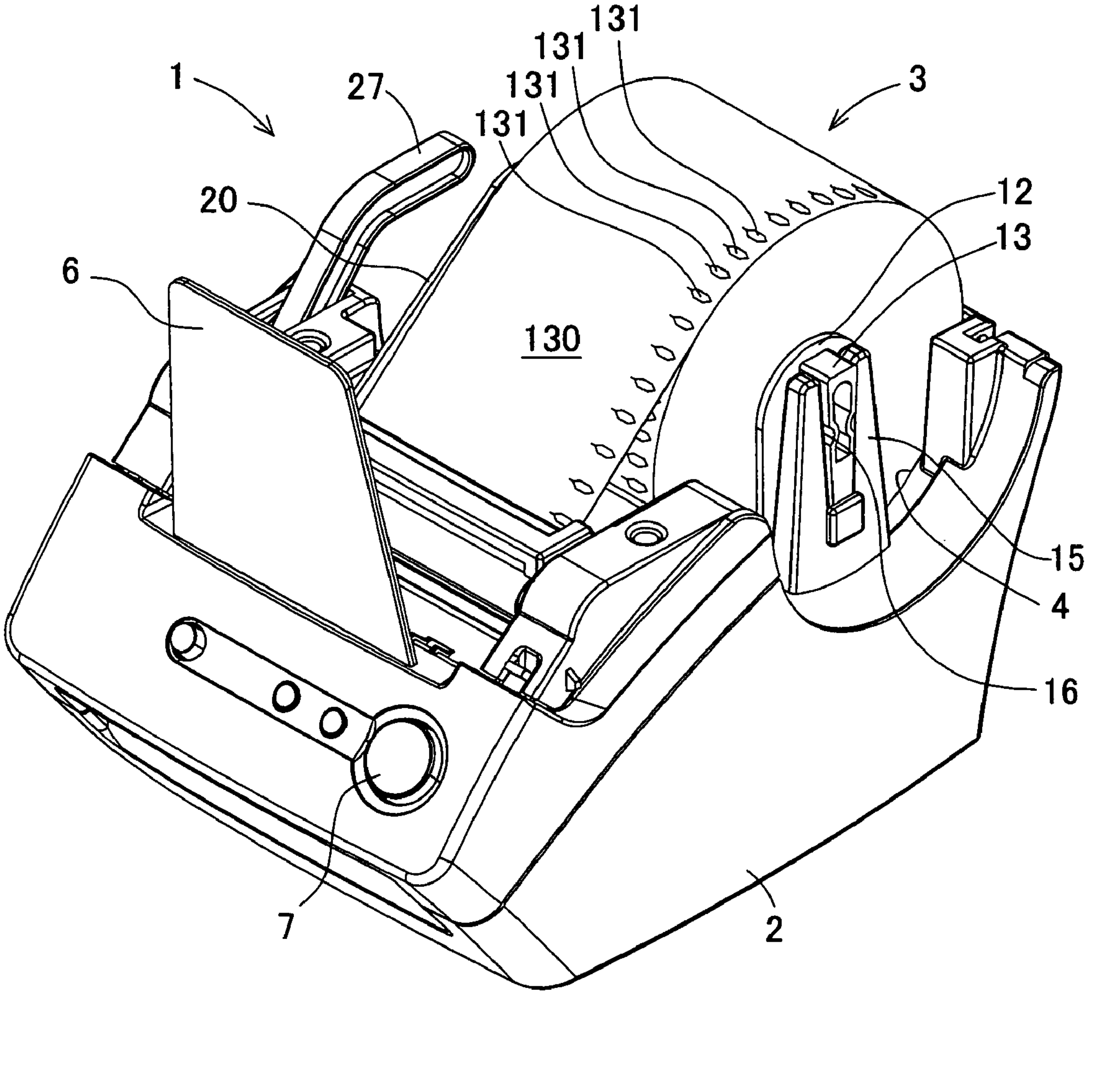
FIG. 17 is a schematic perspective view of a tape printer of a eleventh exemplary embodiment, in which a roll sheet holder holding a roll sheet of a maximum width is set, and from which a top cover is removed.
Figure 18A:
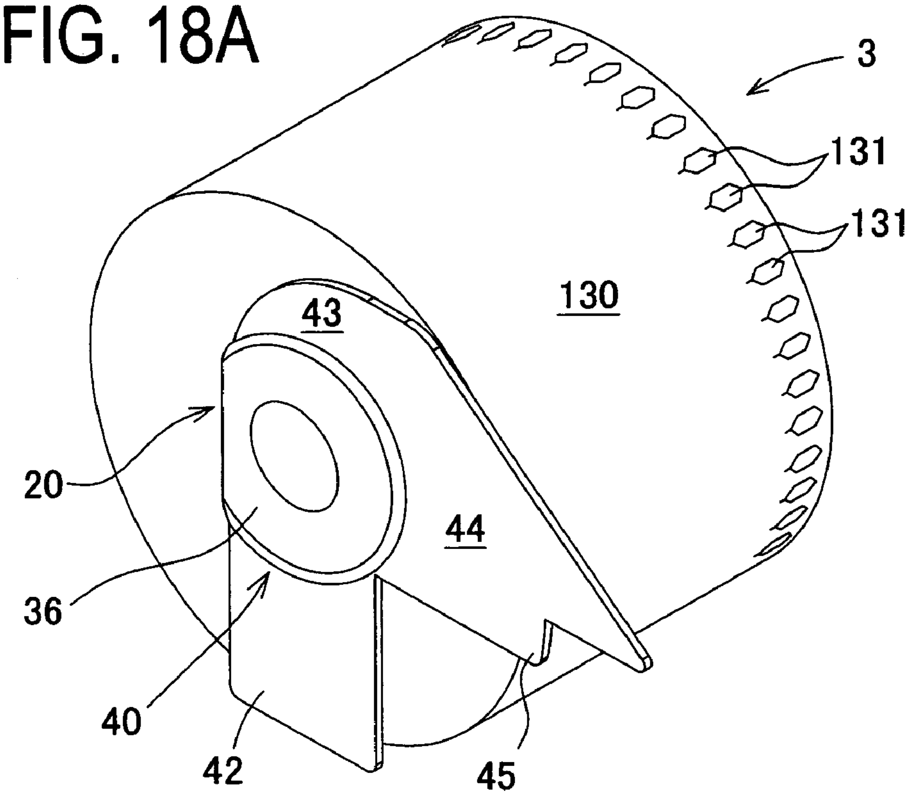
FIG. 18A is a perspective view of the roll sheet holder holding the roll sheet of the eleventh exemplary embodiment, from an upper front side.
Figure 18B:
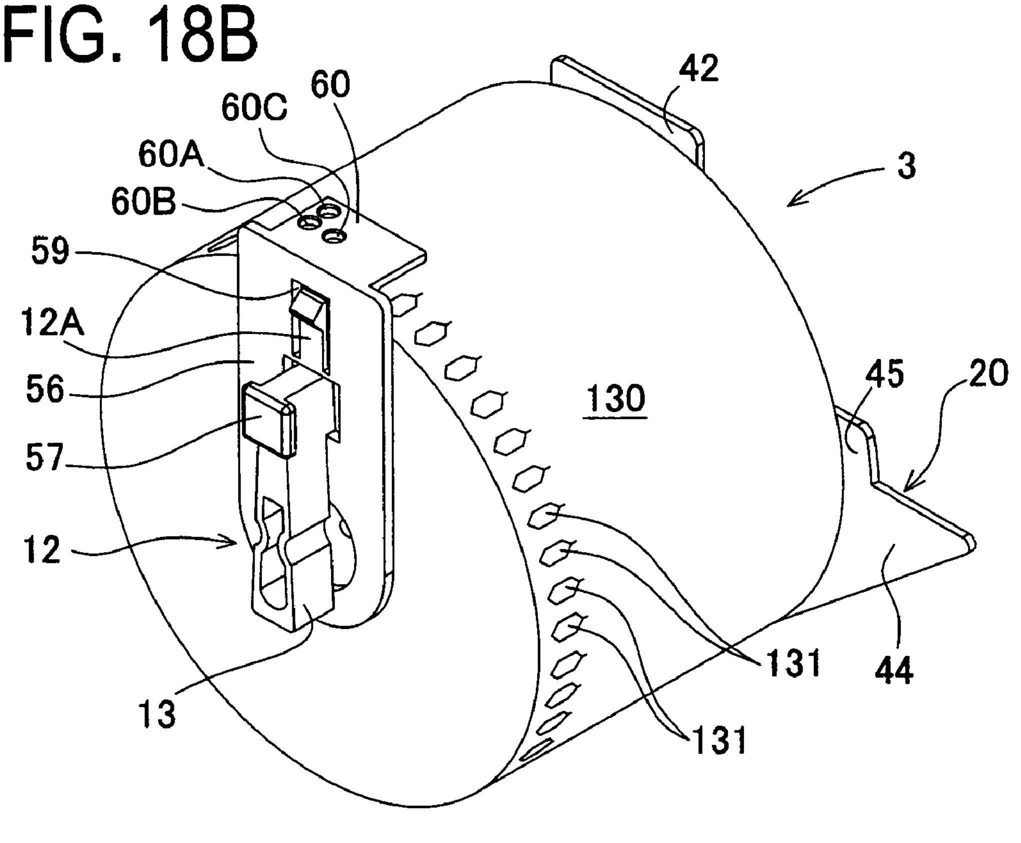
FIG. 18B is a perspective view of the roll sheet holder holding the roll sheet of the eleventh exemplary embodiment, from a lower front side.

As shown in FIGS. 17 through 18B, a roll sheet 130 in the roll sheet holder 3 has the through hole 131 into which the stick-type member 83 can be inserted, at the holding member 12 side end in the width direction, on the side opposite to the photo sensor (see FIG. 3) with the predetermined pitch size, instead of the slit 3C and the encoder mark 5 of the roll sheet 3A of the first exemplary embodiment.

The roll sheet 130 is made of a continuous thermal sheet (so-called thermal paper) having self-coloring property without an adhesive layer on its back side, and the like. The roll sheet 130 is wound on a cylindrically shaped core with a printing face facing inward, or equivalently, with a back face outward. Further, the roll sheet 130 does not need to have the encoder marks 5 on the back side. Therefore, the roll sheet 130 is made of the thermal sheet which does not contain fluorescent material and polychlorinated biphenyl.

Figure 19:
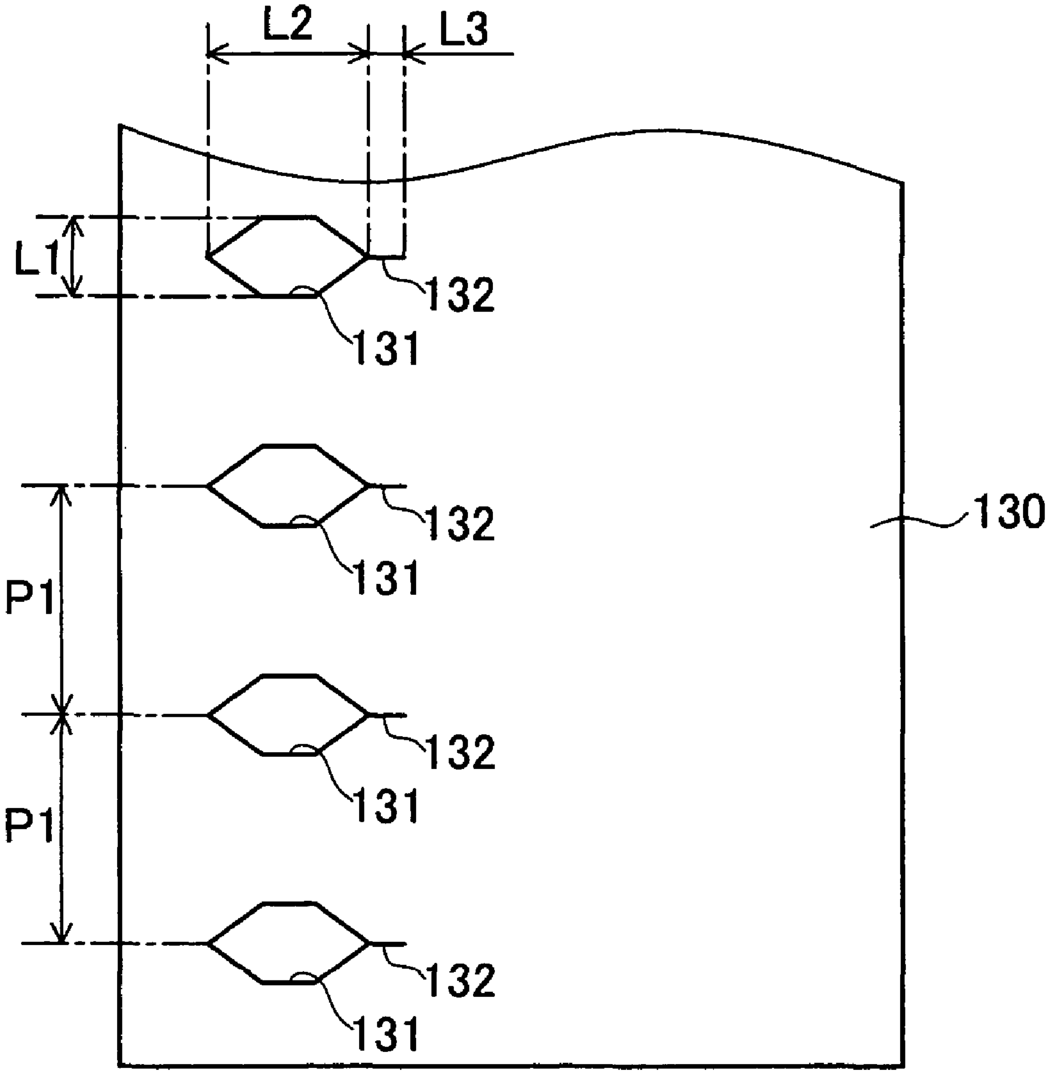
FIG. 19 is an enlarged front view of the roll sheet wound on the roll sheet holder of the eleventh exemplary embodiment.
Figure 20:
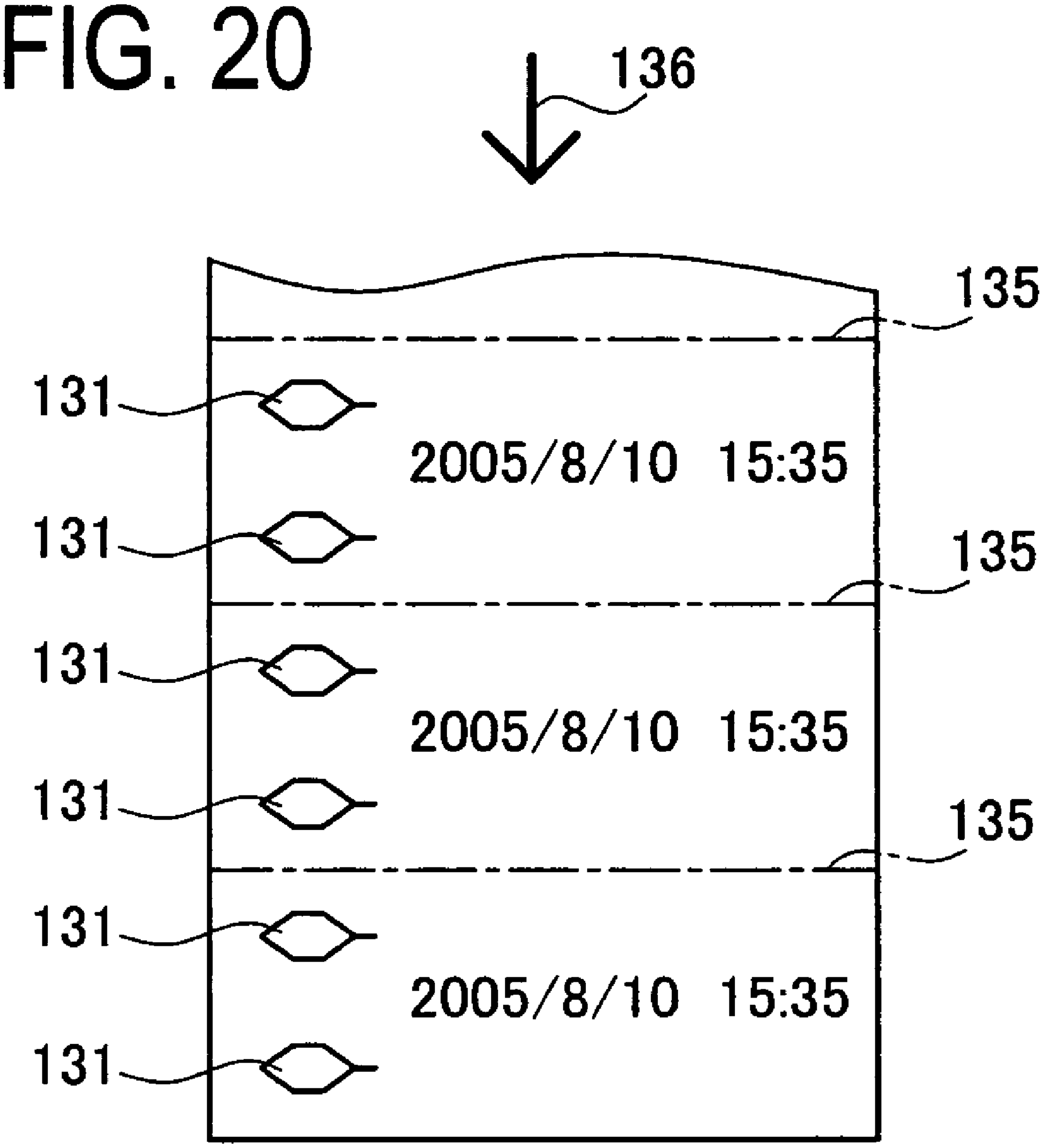
FIG. 20 is a front view of one example of the printed roll sheet of the eleventh exemplary embodiment.

As shown in FIG. 19, each of the through hole 131 is formed with a predetermined pitch size P1 in the feeding direction (for instance, P1=10 mm, 20 mm, or 30 mm. P1 is about 13.25 mm in the eleventh exemplary embodiment). The printed roll sheet 130 is cut by the length of an integral multiple (twice and over) of the predetermined pitch size P1 of the through hole 131, which is determined as the width in the feeding direction. For instance, as shown in FIG. 20, a length between cutting lines 135 (see FIG. 20) is set twice as long as the predetermined pitch size P1.

The hexagonal through hole 131 which is a hexagonal shape substantially long sideways is perforated through the roll sheet 130. A height L1 of the through hole 131 in the feeding direction (for instance, L1=4 mm, 5 mm, or 6 mm. The height L1 is about 4.6 mm in the eleventh exemplary embodiment) is long enough to allow the stick-type member which is circular in cross section as described later (such as a stick of a frankfurter which is usually about 4.6 mm to 5.1 mm in diameter) to be inserted into the through hole 131 (see FIGS. 21, 23A and 23B).

A width L2 of the through hole 131 in the width direction of the roll sheet 130 is set twice as long as the height L1 (for instance, L2=8 mm, 10 mm, or and 12 mm. L2 is about 9.2 mm in the eleventh exemplary embodiment). The through hole 131 has a slit 132 of a length L3 in the width direction of the roll sheet 130 (For instance, L3=2 mm, 3 mm, or 4 mm. L3 is 2 mm in the eleventh exemplary embodiment), extending from an edge of the through hole 131 on the central side of the width of the roll sheet 130. With the slit 132, the through hole 131 can be large enough to allow a long slat-shaped stick-type member which is substantially a rectangle in cross section (such as a skewer onto which pork, chicken and onion to be grilled or fried are threaded after the other), to be inserted into to be inserted thereinto (see FIGS. 22, 24A and 24B).

Next, the feeding process of the roll sheet 130, which is executed when the roll sheet 130 configured as above with the through hole 131 is set in the tape printer 1, will be explained with reference to FIGS. 4 and 6.

Firstly, the CPU 62 performs to store the print data imported from the external computers through the communication interface (I/F) 68 in the print buffer 66A.

After that, the CPU 62 judges the presence or absence of input of a print start instruction signal for commanding to print the print data stored in the print buffer 66A by way of the thermal head 31. If the print start instruction signal is input, the CPU 62 reads 5-bit code entered from the sheet discrimination sensors S1 to S5, and stores in the RAM 66.

Continuously, the CPU 62 reads out the 5-bit code from the RAM 66 again. The data including the kind of the roll sheet 130, the material of the thermal sheet, the width of the roll sheet 130, the pitch size of the through hole 131 in the feeding direction, and the presence or absence of the slit 132, corresponding to the 5-bit code, is read out from the ROM 64, and then stored in the RAM 66.

If the CPU 62 judges that the roll sheet 130 is set in the roll sheet holder 3, the CPU 62 reads out the data of the "material of the thermal sheet" stored in the RAM 66. Next, the CPU 62 reads out the feeding speed for the "material of the thermal sheet" from the ROM 64, which is decided as the feeding speed for this roll sheet 130, and stored in the RAM 66.

The CPU 62 reads out the print data stored in the print buffer 66A, calculates the print width in the feeding direction of the print data, and again reads out the pitch size P1 in the feeding direction of the through hole 131. The CPU 62 stores the length between the cutting lines 135 (see FIG. 20), which is the least integral multiple (more than twice) of the pitch size P1 in the feeding direction and longer than the print width in the feeding direction.

The CPU 62 further reads out the data of the "with/without the slit 132". In the case of "with", the CPU 62 decides that the printing area is inward from the slit 132 in the width direction.

Consequently, the CPU 62 starts driving of the sheet feeding motor 72, and rotates the platen roller 26, and starts feeding of the roll sheet 130 at the feeding speed stored in the RAM 66. When the voltage of the output signal entered from the photo sensor 11 becomes the threshold voltage, the CPU 62 determines that the through hole 131 is opposite to the photo sensor 11, and the platen roller 26 is rotated by a predetermined number of revolutions until the roll sheet 130 is conveyed to the print start position, and the print data stored in the printing buffer 66A is printed by way of the thermal head 31. After feeding the roll sheet 130 by a predetermined length from the moment of the voltage of the output signal entered from the photo sensor 11 reaching the threshold voltage, if the printing output data is not left over in the printing buffer 66A, the CPU 62 further rotates the platen roller 26 by the predetermined number of revolutions until the roll sheet 130 is conveyed to the position where the cutting line 135 is on the opposite side to the cutter unit 8.

The CPU 62 drives the cutting motor 74 to move the cutter unit 8 across the roll sheet 130 reciprocatively, so that the printed part of the roll sheet 130 is cut along the cutting line 135, and terminates this process. As a result of the process, a printed label having the two or more through holes 131 and the slits 132 at the one side end has been produced.

For instance, the case where the data on the expiration date and time of the item is entered as the print data will be explained with reference to FIGS. 20 through 26B.

As shown in FIG. 20, the print data including the expiration date and time of the item, such as "2005/8/10, 15:35", "2005/8/10, 15:35", ""2005/8/10, 15:35" . . . ""2005/8/10, 15:35" is imported from the external computer. When the print start instruction signal is input, the CPU 62 determines the feeding speed of the roll sheet 130, the pitch size of the through hole 131 in the feeding direction, i.e., the length between the cutting lines 135, and the presence of the slit 132, for the roll sheet 130 set in the roll sheet holder 3 based on the detected information by the sheet discrimination sensors S1 to S5.

Consequently, the CPU 62 starts driving of the sheet feeding motor 72, and rotates the platen roller 26, and starts feeding of the roll sheet 130 at the feeding speed stored in the RAM 66 in a direction of an arrow 136. When the voltage of the output signal entered from the photo sensor 11 becomes the threshold voltage, the CPU 62 determines that the through hole 131 is opposite to the photo sensor 11, and the platen roller 26 is rotated by a predetermined number of revolutions until the roll sheet 130 is conveyed to the print start position. The print data stored in the printing buffer 66A, such as "2005/8/10, 15:35", "2005/8/10, 15:35", ""2005/8/10, 15:35" . . . ""2005/8/10, 15:35" is successively printed in the printable region inward from the slit 132 by way of the thermal head 31, in each feeding by the length twice as long as the pitch of the through hole 131 in the feeding direction.

After feeding roll sheet 130 by the predetermined length from the moment of the voltage of the output signal entered from the photo sensor 11 reaching the threshold voltage, the CPU 62 further rotates the platen roller 26 by the predetermined number of revolutions in each sequential printing of the print output data until the roll sheet 130 is conveyed to the position where the cutting line 135 is on the opposite side to the cutter unit 8. Simultaneously, the CPU 62 drives the cutting motor 74 to move the cutter unit 8 across the roll sheet 130 reciprocatively, so that the printed part of the roll sheet 130 is cut along the cutting line 135. After that, the CPU 62 starts driving the sheet feeding motor 72 again, and the left print data is successively printed by way of the thermal head 31, by the length twice as long as the pitch of the through hole 131 in the feeding direction.

Figure 21:
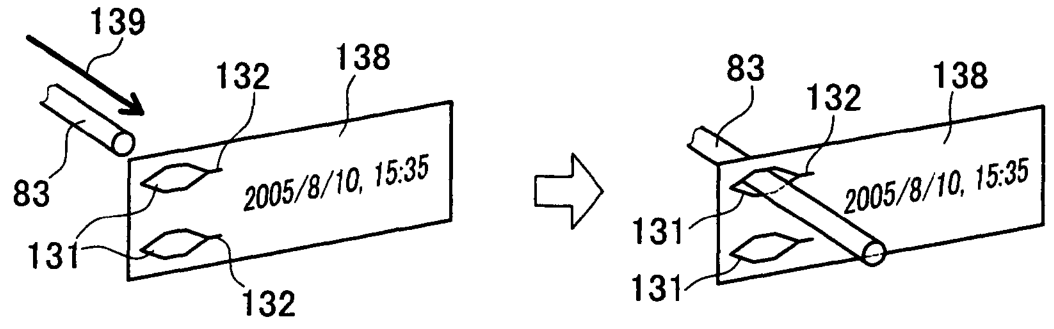
FIG. 21 is a perspective view of the printed label produced by the roll sheet holder of the eleventh exemplary embodiment, showing how to put on the printed label on the stick-type member which is circular in cross section.
Figure 22:
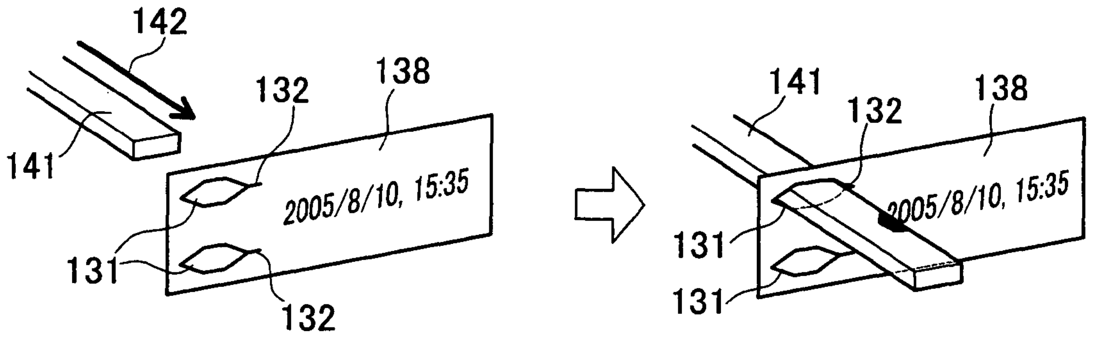
FIG. 22 is a perspective view of the printed label produced by the roll sheet holder of the eleventh exemplary embodiment, showing how to put on the printed label on the stick-type member which is substantially a rectangle in cross section.

Accordingly, as shown in FIGS. 21 and 22, printed labels 138 on which the expiration date and time of the item such as "2005/8/10, 15:35" is printed, having the two through holes 131 and the slits 132 as the insertion part, are sequentially produced.

As shown in FIG. 21, the end of the stick-type member 83 is pressed against the back side of the one of through hole 131 on the printed label 138, and further inserted into the through hole 131 in a direction of an arrow 139, so that the printed label 138 can be easily put on the stick-type member 83. As a result of above, the printed label 138 on which the expiration date and time of the item is printed can be easily put on a stick, for instance, the stick of the frankfurter displayed in a shop window.

Figure 23A:
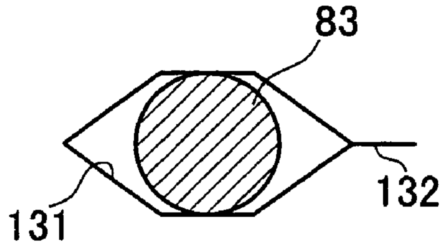
FIG. 23A is a schematic view of the printed label produced by the roll sheet holder of the eleventh exemplary embodiment, showing the case where a stick-type member of which diameter of a circular cross section is as long as a height of a through hole is inserted into the through hole of the printed label.

As shown in FIG. 23A, the printed label 138 can be avoided being slipped off the stick-type member 83 by friction between the both top and bottom sides of the through hole 131 and the stick-type member 83.

Figure 23B:
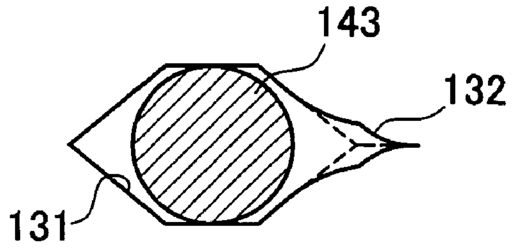
FIG. 23B is a schematic view of the printed label produced by the roll sheet holder of the eleventh exemplary embodiment, showing the case where a stick-type member of which a diameter of a circular cross section is larger than the height of the through hole is inserted into the through hole of the printed label.

Further, FIG. 23B shows the case where a diameter of a stick-type member 143 which is circular in cross section is a little larger than the height L1 of the through hole 131 in the feeding direction of the roll sheet 130. The stick-type member 143 is forcibly inserted into the through hole 131, and thereby the slit 132 becomes widen in the width direction (in the vertical direction in FIG. 23B), so that the printed label 138 can be put on the stick-type member 143 without being torn off. As a result of this, the printed label 138 can be avoided being slipped off the stick-type member 143 by friction between the printed label 138 and the stick-type member 143.

As shown in FIG. 22, the end of a long slat-shaped stick-type member 141 is pressed against the back side of the one of the through hole 131 on the printed label 138, and further inserted into the through hole 131 in a direction of an arrow 142, so that the printed label 138 can be easily put on the stick-type member 141.

Accordingly, the printed label 138 on which the expiration date and time of the item is printed can be easily put on the skewer of pork, chicken and onion to be grilled or fried, displayed in a shop window.

Figure 24A:
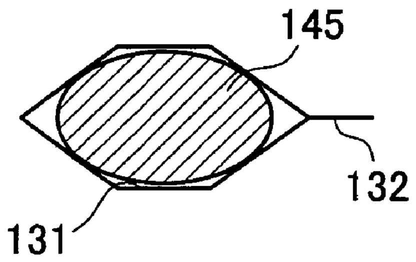
FIG. 24A is a schematic view of the printed label produced by the roll sheet holder of the eleventh exemplary embodiment, showing the case where a stick-type member of which diameter of a long-sideways elliptic cross section is as long as the width of the through hole is inserted into the through hole of the printed label.
Figure 25A:
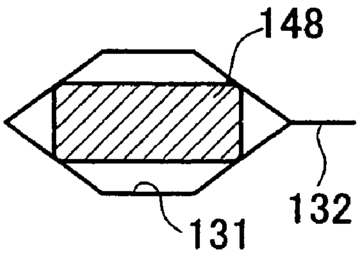
FIG. 25A is a schematic view of the printed label produced by the roll sheet holder of the eleventh exemplary embodiment, showing the case where a stick-type member of which diameter of a long-sideways rectangular cross section is as long as the width of the through hole is inserted into the through hole of the printed label.
Figure 26A:
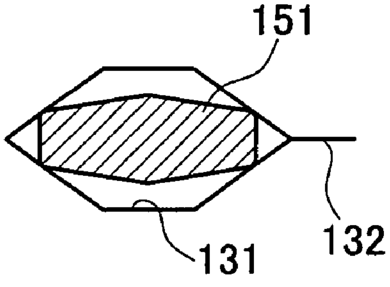
FIG. 26A is a schematic view of the printed label produced by the roll sheet holder of the eleventh exemplary embodiment, showing the case where a stick-type member of which diameter of a long-sideways hexagonal cross section is as long as the width of the through hole is inserted into the through hole of the printed label.

FIGS. 24A, 25A and 26A show a stick-type member 145 which is a long-sideways ellipse in cross section, a stick-type member 148 which is a long-sideways rectangle in cross section, and a stick-type member 151 which is a substantially long-sideways hexagon respectively. When the stick-type members 145, 148 and 151 are inserted into the through hole 131, the printed label 138 can be avoided being slipped off each of the stick-type members 145, 148 and 151 by friction between the printed label 138 and each of the stick-type members 145, 148 and 151.

Figure 24B:
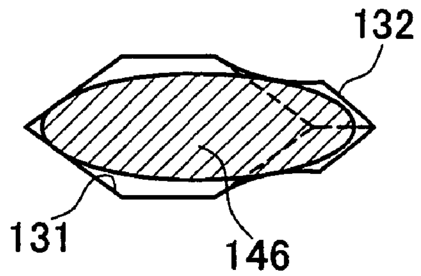
FIG. 24B is a schematic view of the printed label produced by the roll sheet holder of the eleventh exemplary embodiment, showing the case where the stick-type member of which diameter of the long-sideways elliptic cross section is larger than the width of the through hole is inserted into the through hole of the printed label.
Figure 25B:
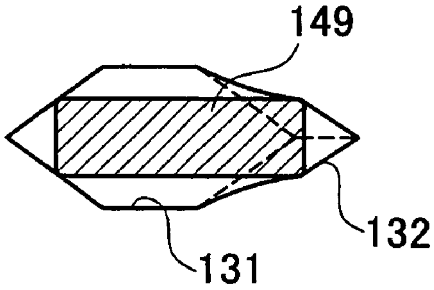
FIG. 25B is a schematic view of the printed label produced by the roll sheet holder of the eleventh exemplary embodiment, showing the case where a stick-type member of which diameter of a long-sideways rectangular cross section is larger than the width of the through hole is inserted into the through hole of the printed label.
Figure 26B:
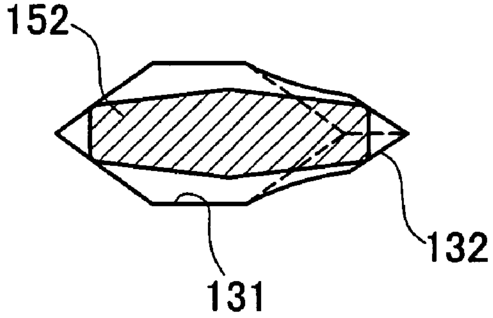
FIG. 26B is a schematic view of the printed label produced by the roll sheet holder of the eleventh exemplary embodiment, showing the case where a stick-type member of which diameter of a long-sideways hexagonal cross section is larger than the width of the through hole is inserted into the through hole of the printed label.

Furthermore, FIGS. 24B, 25B and 26B show a stick-type member 146 which is a long-sideways ellipse in cross section, a stick-type member 149 which is a long-sideways rectangle in cross section, and a stick-type member 152 which is a substantially long-sideways hexagon respectively. The widths of each stick-type member 146, 149 and 152 are larger than the width L2 of the through hole 131 in the width direction of the roll sheet 130. The stick-type members 146, 149 and 152 are forcibly inserted into the through hole 131, and thereby the slit 132 becomes widen in the width direction (in the vertical direction in FIGS. 24B, 25B and 26B). As a result of this, the printed label 138 can be easily put on the stick-type members 146, 149 and 152 without being torn off, and also avoided being slipped off each of the stick-type members 146, 149 and 152 by friction between the oblique sides of the through hole 131 which are hexagonal shapes substantially long sideways, and each of the stick-type members 146, 149 and 152.

Therefore, when the roll sheet holder 3 holding the roll sheet 130 of the eleventh exemplary embodiment is set in the tape printer 1, the data corresponding to the kind of the roll sheet 130 is determined through the sensor holes 60A to 60E of the roll sheet discrimination part 60 and the sheet discrimination sensors S1 to S5. The photo sensor 11 detects the through hole 131 which is shaped like the hexagon substantially long in the tape width direction and perforated through the roll sheet 130. Based on the detected information, the platen roller 26, the sheet feeding motor 72, the thermal head 31 and the drive circuit 71 are driven and controlled to print the print data such as the expiration date and time of the item on the roll sheet 130. The sheet feeding motor 72 is temporarily stopped after feeding the roll sheet 130 by length of an integral multiple (twice and over) of the predetermined pitch size P1 of the through hole 131. Simultaneously, the cutting motor 74 drives the cutter unit 8 across the roll sheet 130 reciprocatively, so that the printed part of the roll sheet 130 is cut along the cutting line 135.

Accordingly, the predetermined print data such as "2005/8/10, 15:35" indicating the expiration date and time of the item is printed, and at least two of through holes 131 which are hexagonal shapes substantially long sideways and the slit 132 are formed at the side end, on the printed label 138, which is automatically and successively produced. Further, the end of the stick-type members 83, 141 and others are pressed into the through hole 131 of the printed label 138 from the back side thereof, and is further inserted into the insertion hole 131, so that the printed label 138 can be easily put on the stick-type members 83, 141 and others. Therefore, the printed label 138 on which "2005/8/10, 15:35" on which the expiration date and time are printed can be quickly put on the stick-type member 83, 141 and others.

When the stick-type member 83 which is circular in cross section is forcibly inserted into one of the through hole 131 of the printed label 138, the printed label 138 can be avoided being slipped off the stick-type member 83 by friction between the printed label 138 and the stick-type member 83. Further, when each of the stick-type member 145 which is the long-sideways ellipse in cross section, the stick-type member 148 which is the long-sideways rectangle in cross section, and the stick-type member 151 which is the substantially long-sideways hexagon in cross section, are pressed into the through hole 131, the printed label 138 can be avoided being slipped off the stick-type members 145, 148 and 151 by friction between the oblique sides of the through hole 131 which are hexagonal shapes substantially long sideways, and each of the stick-type members 145, 148 and 151.

When the diameter of the stick-type member 143 which is circular in cross section is a little larger than the height L1 of the through hole 131, the stick-type member 143 is pressed into the through hole 131, and thereby the slit 132 becomes widen. As a result of this, the stick-type member 143 can be easily inserted into the printed label 138, and the printed label 138 can be prevented from being torn. Therefore, the printed label 138 can be securely put on the stick-type member 143. Furthermore, the widths of each stick-type member 146, 149 and 152 are a little larger than the width L2 of the through hole 131 in the width direction of the roll sheet 130. The stick-type members 146, 149 and 152 are forcibly inserted into the through hole 131, and thereby the slit 132 becomes widen in the width direction. As a result of this, the printed label 138 can be easily put on the stick-type members 146, 149 and 152, and the printed label 138 can be prevented from being torn. Furthermore, with the slit 132 formed with the through hole 131, the through hole 131 can be small by having the slit 132. Therefore, the roll sheet 130 can be prevented from getting caught in the insertion port 18 of the roll sheet 130 and at the entry of the thermal head 31 of the tape printer 1, and thus the roll sheet 130 can be fed smoothly providing a high-quality printing.

The widths L2 of the through hole 131 is formed twice as long as the height L1 of the through hole 131. Therefore, the printed labels can be put on the slat-shaped stick-type members 141, 145, 148, 151 which has the widths twice as wide as the stick-type members 83 and 143 which are circular in cross section and can be inserted into the through hole 131.

Each through hole 131 has the slit 132 of the length L3 in the width direction of the roll sheet 130. Therefore, the printed labels can be put on the slat-shaped stick-type members 141, 145, 148, 151 which has the widths twice as wide as the stick-type members 83 and 143 which are circular in cross section and can be inserted into the through hole 131.

For instance, the printed labels can be put on the stick of the frankfurter which is generally about 4.6 mm to 5.1 mm in diameter, and the skewer of pork, chicken and onion to be grilled or fried, which is generally about 2.5 mm to 3.5 mm in thickness and 8.5 mm to 10.5 mm in width.

Further, the roll sheet 130 is made of the thermal sheet which does not contain fluorescent material and polychlorinated biphenyl, without the adhesive layer on its back side, so that the printed label 138 can be safely used to be put on stick-type members of items such as foods. It is also possible to produce the printed label 138 which can be completely removed from the stick-type member 83, 141 and others without any adhesive left.

The disclosure may be embodied in other specific forms without departing from the spirit or essential characteristics thereof. For instance, the roll sheet 3A according to the first through tenth exemplary embodiments may also be composed of only the thermal sheet which does not contain fluorescent material or polychlorinated biphenyl. Accordingly, the printed label 82, 92 and others can be put on and used the stick-type member 83 without any problems in the safety of the food hygiene.

What is claimed is:

1. A system for printing tape with a roll sheet holder holding a long roll sheet, and arranged to be removably mounted and used in a tape printer, which comprises:

an insertion port into which the long roll sheet is inserted;

a feeding device that unwinds and feeds the long roll sheet;

a printing device that prints on the roll sheet fed with the feeding device; and a cutting device that cuts the printed roll sheet printed with the printing device, the roll sheet holder comprising:

a holder shaft that rotatably holds the roll sheet wound on a sheet core;

a guide member that is in contact with one of end faces of the roll sheet; and a positioning member that is in contact with other one of the end faces of the roll sheet, wherein the guide member includes an extended portion part of which extends in a direction of the insertion port by a predetermined length from maximum outer diameter of the roll sheet, wherein the roll sheet comprises:

an insertion part into which a stick-type member is insertable, formed with a predetermined pitch in a longitudinal direction of the roll sheet; and an encoder mark formed on a back side with a predetermined pitch to be placed between the insertion parts, wherein the tape printer further comprises:

a mark detection sensor that detects the encoder mark; and a control unit that drives and controls the feeding device and the printing device based on information detected by the mark detection sensor, and wherein the predetermined pitch is equal to a length between cutting lines along which the printed roll sheet is cut.

2. A system for printing tape according to claim 1, wherein the insertion part comprises:

a bendable part formed on a front edge of the insertion part in a feeding direction; and a slit formed extending from both ends of the bend part to a back edge of the insertion part in the feeding direction.

3. A system for printing tape according to claim 1, wherein the insertion part comprises: two cutting parts formed in parallel in a width direction of the roll sheet with a predetermined space therebetween in the feeding direction.

4. A system for printing tape according to claim 3, wherein the cutting part is shaped like a dog leg, projecting backward in the feeding direction in top view.

5. A system for printing tape according to claim 1, wherein the insertion part comprises: a through hole which is perforated at least one side end portion of the roll sheet in the width direction, and is smaller than a size of a cross section of the stick-type member.

6. A system for printing tape according to to claim 5, wherein the through hole comprises: a slit of predetermined length, which is formed radially extending from the through hole to widen the through hole when the stick-type member is inserted in the through hole.

7. A system for printing tape according to claim 1, wherein the insertion part comprises:

a through hole which is perforated at least one side end portion of the roll sheet in the width direction; and a slit-shaped insertion guide hole which is formed from the periphery of the through hole to the rear cutting line in the feeding direction.

8. A system for printing tape according to claim 1, wherein the insertion part comprises:

a through hole which is perforated at least one side end portion of the roll sheet in the width direction; and a cutting part which is formed from the periphery of the through hole to the rear cutting line in the feeding direction so that the through hole becomes open to the rear cutting line.

9. A system for printing tape according to claim 1, wherein the roll sheet holder comprises:

a roll sheet determination part which determines a kind of the roll sheet in conjunction with a sensor device arranged at a bottom of the tape printer.

10. A system for printing tape according to claim 1, wherein the roll sheet is composed of only a long, continuous, unfixed-length roll sheet having no adhesive layer.

11. A system for printing tape according to claim 10, wherein the unfixed-length roll sheet has no fluorescent material and polychlorinated biphenyl.

12. A system for printing tape with a roll sheet holder holding a long roll sheet, and arranged to be removably mounted and used in a tape printer which comprises:

an insertion port into which the long roll sheet is inserted;
a feeding device that unwinds and feeds the roll sheet;
a printing device that prints on the roll sheet fed with the feeding device; and
a cutting device that cuts the printed roll sheet printed with the printing device, the roll sheet holder comprising:
a holder shaft that rotatably holds the roll sheet wound on a sheet core;
a guide member that is in contact with one of end faces of the roll sheet; and
a positioning member that is in contact with other one of the end faces of the roll sheet,
wherein the guide member includes an extended portion part of which extends in a direction of the insertion port by a predetermined length from maximum outer diameter of the roll sheet,
wherein the roll sheet comprises an insertion part into which a stick-type member is insertable, fanned with a predetermined pitch in a longitudinal direction of the roll sheet,
wherein the insertion part comprises:
a through hole which is perforated at least one side end of the roll sheet in the width direction; and
wherein the printer comprises:
a through hole detection sensor that detects the through hole;
the control unit that drives and controls the feeding device and the printing device based on information detected by the through hole detection sensor, and
wherein the through hole is formed in a hexagonal shape which is substantially long in the width direction of the roll sheet.

13. A system for printing tape according to claim 12, wherein the through hole comprises a slit of predetermined length, which is formed radially extending from a central side edge of the hexagonal through hole substantially long in the width direction, to widen the through hole when the stick-type member is inserted in the through hole.

14. A system for printing tape according to claim 13, wherein the roll sheet comprises the hexagonal through hole substantially long in the width direction, in which a length between both sides of the through hole in a longitudinal direction of the roll sheet is about half of a length between both edges of the through hole in the width direction of the roll sheet.

15. A system for printing tape according to claim 12, wherein the roll sheet comprises the hexagonal through hole substantially long in the width direction, in which a length between both sides of the through hole in a longitudinal direction of the roll sheet is about half of a length between both edges of the through hole in the width direction of the roll sheet.

16. A system for printing tape according to claim 12, wherein the roll sheet holder comprises:
a roll sheet determination part which determines a kind of the roll sheet in conjunction with a sensor device provided at a bottom of the tape printer.

17. A system for printing tape according to claim 12, wherein the roll sheet is composed of only a long, continuous, unfixed-length roll sheet having no adhesive layer.

18. A system for printing tape according to claim 17, wherein the unfixed-length roll sheet has no fluorescent material and the polychlorinated biphenyl.

* * * * *